United States Patent
Choi et al.

(10) Patent No.: US 9,419,759 B2
(45) Date of Patent: Aug. 16, 2016

(54) METHOD AND APPARATUS FOR TRANSRECEIVING SYNCHRONIZATION SIGNAL IN WIRELESS COMMUNICATION SYSTEM

(75) Inventors: Hyeyoung Choi, Anyang-si (KR); Jinmin Kim, Anyang-si (KR); Seunghee Han, Anyang-si (KR); Hyukmin Son, Anyang-si (KR); Hyunwoo Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 115 days.

(21) Appl. No.: 14/239,062

(22) PCT Filed: Aug. 14, 2012

(86) PCT No.: PCT/KR2012/006471
§ 371 (c)(1),
(2), (4) Date: Feb. 14, 2014

(87) PCT Pub. No.: WO2013/025039
PCT Pub. Date: Feb. 21, 2013

(65) Prior Publication Data
US 2014/0211753 A1 Jul. 31, 2014

Related U.S. Application Data

(60) Provisional application No. 61/523,818, filed on Aug. 15, 2011, provisional application No. 61/546,564, filed on Oct. 13, 2011.

(51) Int. Cl.
*H04L 5/00* (2006.01)
*H04W 56/00* (2009.01)
*H04L 27/26* (2006.01)

(52) U.S. Cl.
CPC .............. *H04L 5/0048* (2013.01); *H04L 5/001* (2013.01); *H04L 27/2655* (2013.01);
(Continued)

(58) Field of Classification Search
CPC .............. H04L 5/0007; H04L 27/2636; H04L 27/2646; H04L 27/2666; H04L 27/2698
See application file for complete search history.

(56) References Cited

U.S. PATENT DOCUMENTS

2006/0280273 A1  12/2006  Mueller-Weinfurtner
2007/0183386 A1*  8/2007  Muharemovic ......... H04L 5/023
                                              370/344

(Continued)

FOREIGN PATENT DOCUMENTS

KR    10-2008-0064756 A    7/2008
WO      2007/052115 A2    5/2007

OTHER PUBLICATIONS

International Search Report from PCT/KR2012/006471, dated Jan. 28, 2013.

(Continued)

*Primary Examiner* — Jung-Jen Liu
(74) *Attorney, Agent, or Firm* — Dentons US LLP

(57) ABSTRACT

One embodiment of the present invention relates to a method for a terminal acquiring synchronization in a wireless communication system, comprising the steps of: receiving a first signal from on a first carrier; receiving a second signal, which is positioned on a resource element having a predetermined pattern, from at least one subframe from subframes excluding the subframe that receives the first signal; and acquiring synchronization with respect to the first carrier by using the first signal and the second signal.

11 Claims, 17 Drawing Sheets

(52) U.S. Cl.
CPC .......... *H04L 27/2675* (2013.01); *H04W 56/00* (2013.01); *H04L 5/005* (2013.01); *H04L 5/0007* (2013.01); *H04L 5/0051* (2013.01); *H04L 27/2607* (2013.01)

(56) References Cited

U.S. PATENT DOCUMENTS

| | | | |
|---|---|---|---|
| 2010/0104034 A1* | 4/2010 | Nam | H04L 5/0007 375/260 |
| 2010/0195748 A1* | 8/2010 | Nam | H04J 11/0069 375/260 |
| 2010/0290376 A1* | 11/2010 | Dai | H04L 5/0007 370/294 |
| 2010/0290378 A1* | 11/2010 | Wu | H04W 52/0216 370/311 |
| 2011/0002430 A1 | 1/2011 | Kim | |
| 2011/0158164 A1* | 6/2011 | Palanki | H04W 56/0015 370/328 |
| 2011/0274031 A1* | 11/2011 | Gaal | H04L 5/0051 370/315 |
| 2011/0280201 A1* | 11/2011 | Luo | H04W 72/0406 370/329 |
| 2012/0039282 A1* | 2/2012 | Kim | H04W 52/54 370/329 |
| 2012/0120924 A1* | 5/2012 | Montojo | H04W 48/12 370/336 |
| 2012/0213261 A1* | 8/2012 | Sayana | H04L 5/0094 375/224 |

OTHER PUBLICATIONS

Written Opinion of the ISA from PCT/KR2012/006471, dated Jan. 28, 2013.

* cited by examiner

FIG. 10
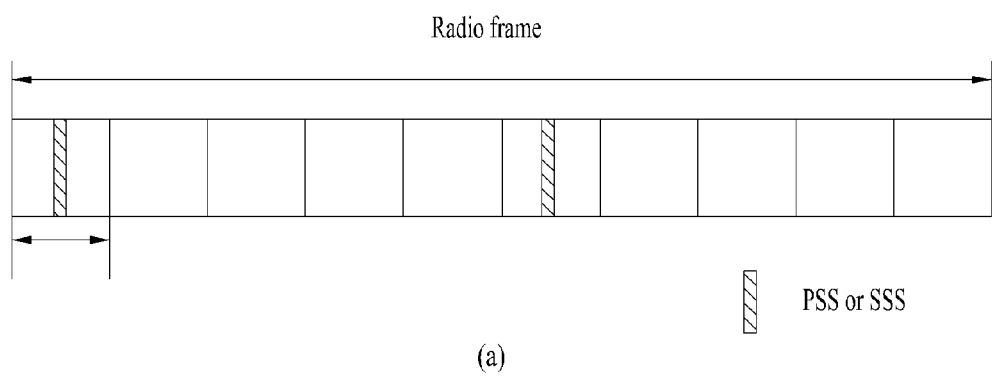
(a)
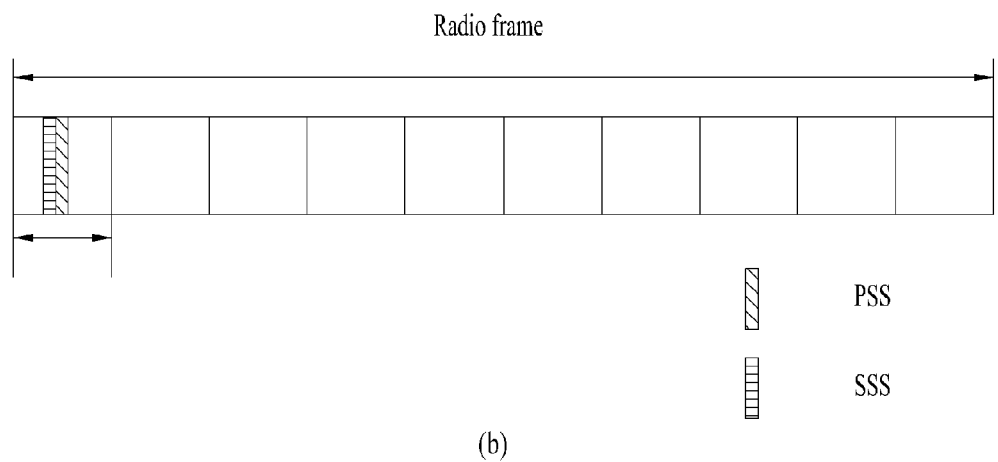
(b)

FIG. 15
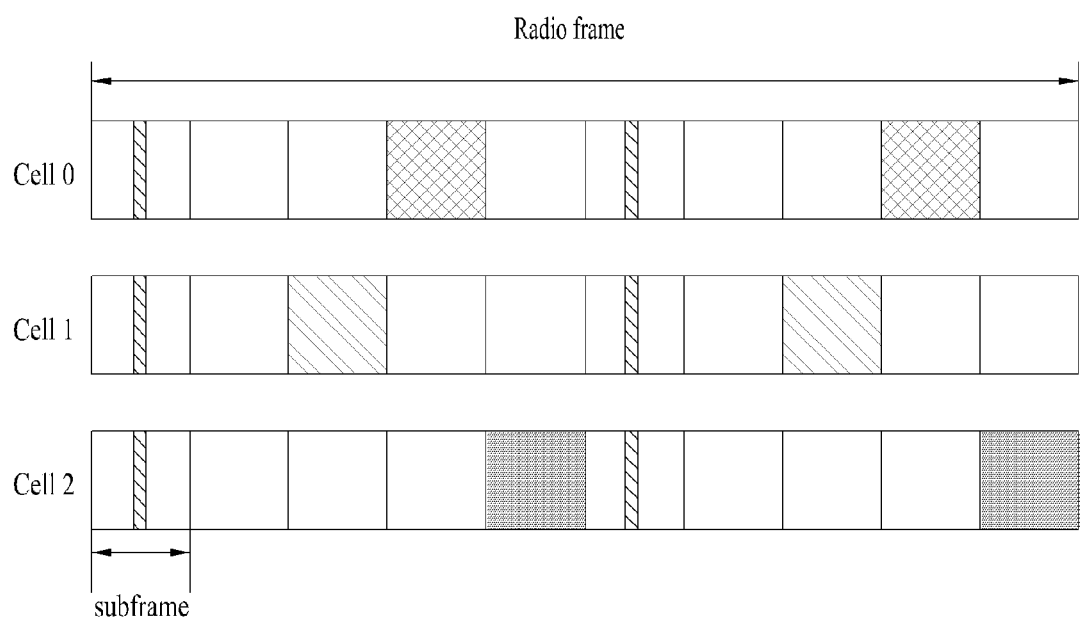

METHOD AND APPARATUS FOR TRANSRECEIVING SYNCHRONIZATION SIGNAL IN WIRELESS COMMUNICATION SYSTEM

This application is a 35 USC §371 National Stage entry of International Application No. PCT/KR2012/006471, filed on Aug. 14, 2012, and claims priority to U.S. Provisional Application Nos. 61/523,818 filed Aug. 15, 2011 and 61/546,564 filed Oct. 13, 2011, each of which is hereby incorporated by reference in its entirety.

TECHNICAL FIELD

The present invention relates to a method of transceiving signals for acquiring synchronization in a wireless communication system and apparatus therefor.

BACKGROUND ART

Wireless communication systems have been widely deployed to provide various types of communication services such as voice or data services. Generally, a wireless communication system is a multiple access system capable of supporting communication with multiple users by sharing available system resources (bandwidth, transmit power, etc.). Multiple access systems include, for example, a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

An object of the present invention is to provide a method of transceiving a signal for synchronization of an extended carrier.

The technical objects that can be achieved through the present invention are not limited to what has been particularly described hereinabove and other technical objects not described herein will be more clearly understood by persons skilled in the art from the following detailed description.

Technical Solution

In a $1^{st}$ aspect of the present invention, provided herein is a method for acquiring synchronization of a user equipment in a wireless communication system, the method including receiving a $1^{st}$ signal on a $1^{st}$ carrier, receiving a $2^{nd}$ signal located on a resource element of a prescribed pattern in at least one subframe except a subframe having the $1^{st}$ signal received therein, and acquiring the synchronization for the $1^{st}$ carrier using the $1^{st}$ signal and the $2^{nd}$ signal.

In a $2^{nd}$ aspect of the present invention, provided herein is a method of transmitting a signal for synchronization acquisition, which is transmitted by a base station in a wireless communication system, the method including transmitting a $1^{st}$ signal on a $1^{st}$ carrier and transmitting a $2^{nd}$ signal located on a resource element of a prescribed pattern in at least one subframe except a subframe having the $1^{st}$ signal received therein, wherein the $1^{st}$ signal and the $2^{nd}$ signal are provided for a user equipment to acquire synchronization for the $1^{st}$ carrier.

In a $3^{rd}$ aspect of the present invention, provided herein is a user equipment in a wireless communication system, the user equipment including a receiving module and a processor receiving a $1^{st}$ signal on a $1^{st}$ carrier, the processor receiving a $2^{nd}$ signal located on a resource element of a prescribed pattern in at least one subframe except a subframe having the $1^{st}$ signal received therein, the processor acquiring the synchronization for the $1^{st}$ carrier using the $1^{st}$ signal and the $2^{nd}$ signal.

In a $4^{th}$ aspect of the present invention, provided herein is a base station in a wireless communication system, the base station includes a transmitting module and a processor transmitting a $1^{st}$ signal on a $1^{st}$ carrier, the processor transmitting a $2^{nd}$ signal located on a resource element of a prescribed pattern in at least one subframe except a subframe having the $1^{st}$ signal received therein, wherein the $1^{st}$ signal and the $2^{nd}$ signal are provided for a user equipment to acquire synchronization for the $1^{st}$ carrier.

In the $1^{st}$ to $4^{th}$ aspects of the present invention, the following items may be included entirely or in part.

The $1^{st}$ carrier may include an extension carrier of which accessibility is determined depending on UE (user equipment) capability.

The $1^{st}$ carrier may be indicated by a physical downlink control channel received on a $2^{nd}$ carrier.

The $2^{nd}$ signal may be received on 6 resource blocks in the middle of a whole frequency bandwidth.

The $2^{nd}$ signal may be received on resource blocks of which number is determined depending on a size of a whole frequency bandwidth.

A location of a resource block carrying the $2^{nd}$ signal may be determined in accordance with a cell identifier.

Locations of n resource blocks carrying the $2^{nd}$ signal may be determined by a following formula: $n(N_{ID}^{cell} \bmod \lfloor N_{DL}^{RB}/n \rfloor) + i$, $i=0, \ldots, n$, wherein the $N_{ID}^{cell}$ means the cell identifier, and wherein the $N_{DL}^{RB}$ means the number of resource blocks on the whole frequency band.

A location of a resource block of the $2^{nd}$ signal may be distributed on a whole frequency band.

Frequency hopping may be applied to a location of a resource block of the $2^{nd}$ signal in accordance with a subframe.

The at least one subframe having the $2^{nd}$ signal received therein may be determined in accordance with a cell identifier.

The $2^{nd}$ signal may include a cell-specific reference signal or a channel state information reference signal.

The $1^{st}$ signal may be transmitted in at least one of a $1^{st}$ subframe and a $6^{th}$ subframe of each radio frame.

The method $1^{st}$ signal may include a primary synchronous signal or a secondary synchronous signal.

Advantageous Effects

According to the present invention, a user equipment can efficiently acquire synchronization.

Effects according to the present invention are not limited to what has been particularly described hereinabove and other advantages not described herein will be more clearly understood by persons skilled in the art from the following detailed description of the present invention.

DESCRIPTION OF DRAWINGS

FIG. 10 and FIG. 11 are diagrams to describe a $1^{st}$ signal according to one embodiment of the present invention.

FIGS. 12 to 16 are diagrams to describe a $2^{nd}$ signal according to one embodiment of the present invention.

BEST MODE FOR CARRYING OUT THE INVENTION

Figure 1:
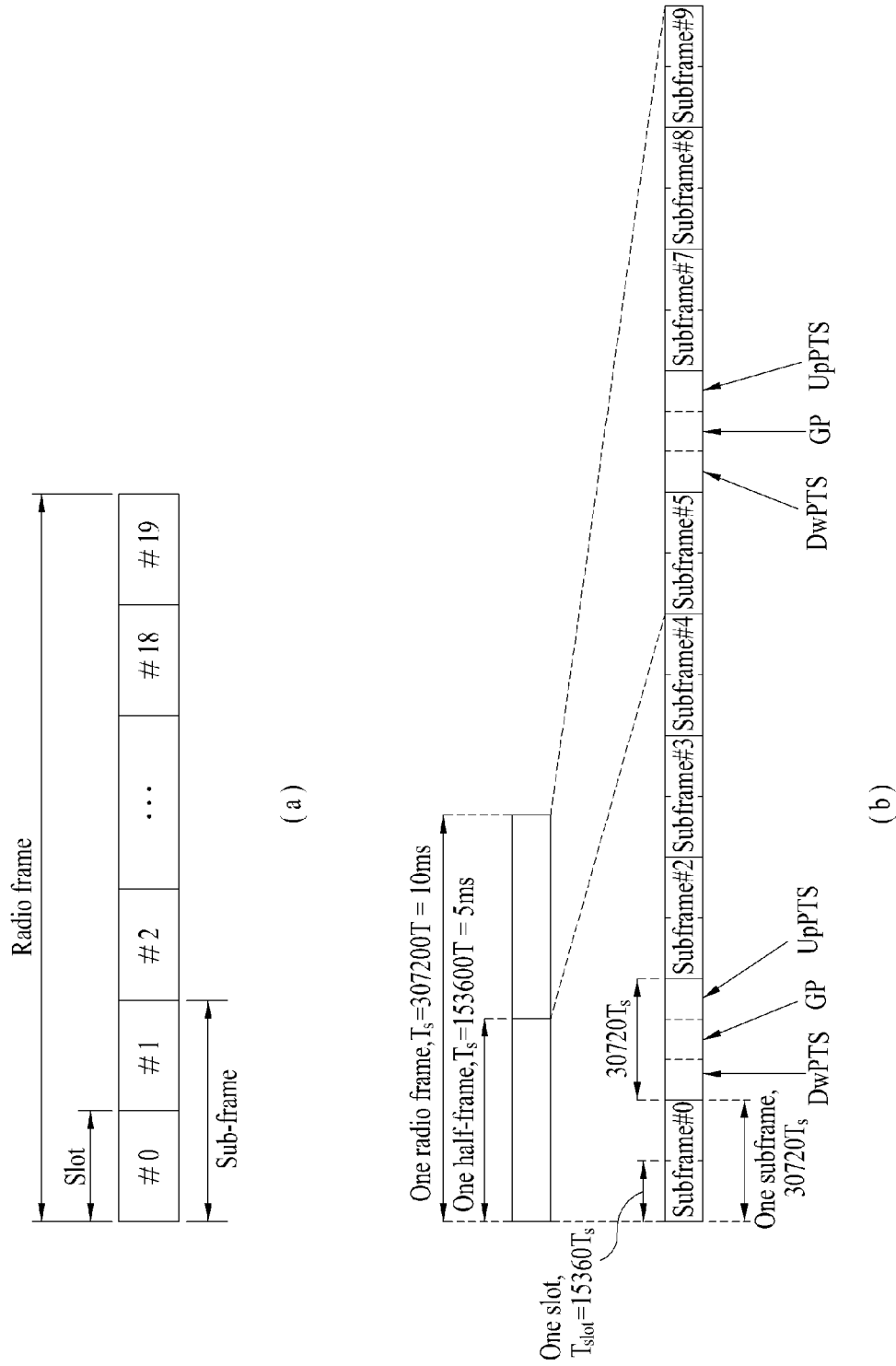
FIG. 1 is a diagram to describe a structure of a radio frame.

First of all, the following embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, an embodiment of the present invention may be implemented by combining elements and/or features together in part. A sequence of operations explained for each embodiment of the present invention may be modifiable. Some configurations or features of one embodiment may be included in another embodiment or substituted with corresponding configurations or features of another embodiment.

In the present specification, embodiments of the present invention are described centering on the data transmission/reception relations between a base station and a terminal. In this case, the base station may be meaningful as a terminal node of a network which directly performs communication with the terminal. In this disclosure, a specific operation explained as performed by a base station may be performed by an upper node of the base station in some cases.

In particular, in a network constructed with a plurality of network nodes including a base station, it is apparent that various operations performed for communication with a terminal can be performed by a base station or other networks other than the base station. 'Base station (BS)' may be substituted with such a terminology as a fixed station, a Node B, an eNode B (eNB), an access point (AP) and the like. A relay may be substituted with such a terminology as a relay node (RN), a relay station (RS) and the like. And, 'terminal' may be substituted with such a terminology as a user equipment (UE), a mobile station (MS), a mobile subscriber station (MSS), a subscriber station (SS) and the like.

Specific terminologies used for the following description may be provided to help the understanding of the present invention. And, the use of the specific terminology may be modified into another form within the scope of the technical idea of the present invention.

Occasionally, to prevent the present invention from getting vaguer, structures and/or devices known to the public may be skipped or represented as block diagrams centering on the core functions of the structures and/or devices. Wherever possible, the same reference numbers will be used throughout the drawings to refer to the same or like parts in this specification.

Embodiments of the present invention may be supported by the disclosed standard documents of at least one of wireless access systems including IEEE 802 system, 3GPP system, 3GPP LTE system, 3GPP LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) is an evolved version of 3GPP LTE. WiMAX may be explained by IEEE 802.16e specifications (e.g., WirelessMAN-OFDMA reference system) and advanced IEEE 802.16m specifications (e.g., WirelessMAN-OFDMA advanced system). For clarity, the following description mainly concerns 3GPP LTE system or 3GPP LTE-A system, by which the technical idea of the present invention may be non-limited.

FIG. 1 is a diagram for a structure of a radio frame used by 3GPP LTE system. Referring to FIG. 1 (a), one radio frame includes 10 subframes. Each of the subframes includes 2 slots in a time domain. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in a time domain. Since 3GPP LTE system uses OFDMA in downlink, the OFDM symbol indicates one symbol duration (or period). The OFDM symbol may be named SC-FDMA symbol or symbol period in uplink. Resource block (RB) is a resource allocation unit and may include a plurality of contiguous subcarriers in one slot. The above-mentioned radio frame structure is just exemplary. Hence, the number of subframes included in a radio frame, the number of slots included in the subframe and the number of OFDM symbols included in the slot may be modified in various ways.

FIG. 1 (b) shows one example of a structure of a type-2 radio frame 2. The type-2 radio frame includes 2 half frames. Each of the half frame includes 5 subframes, DwPTS (downlink pilot time slot), GP (guard period) and UpPTS (uplink pilot time slot). And, one of the subframes includes 2 slots. The DwPTS is used for initial cell search, synchronization or channel estimation in a user equipment. The UpPTS is used for channel estimation in a base station and uplink transmission synchronization of a user equipment. The guard period is a period for eliminating interference generated in uplink due to multi-path delay of a downlink signal between uplink and downlink.

The above-described structures of the radio frame are just exemplary. And, the number of subframes included in a radio frame, the number of slots included in the subframe and the number of symbols included in the slot may be modified in various ways.

Figure 2:
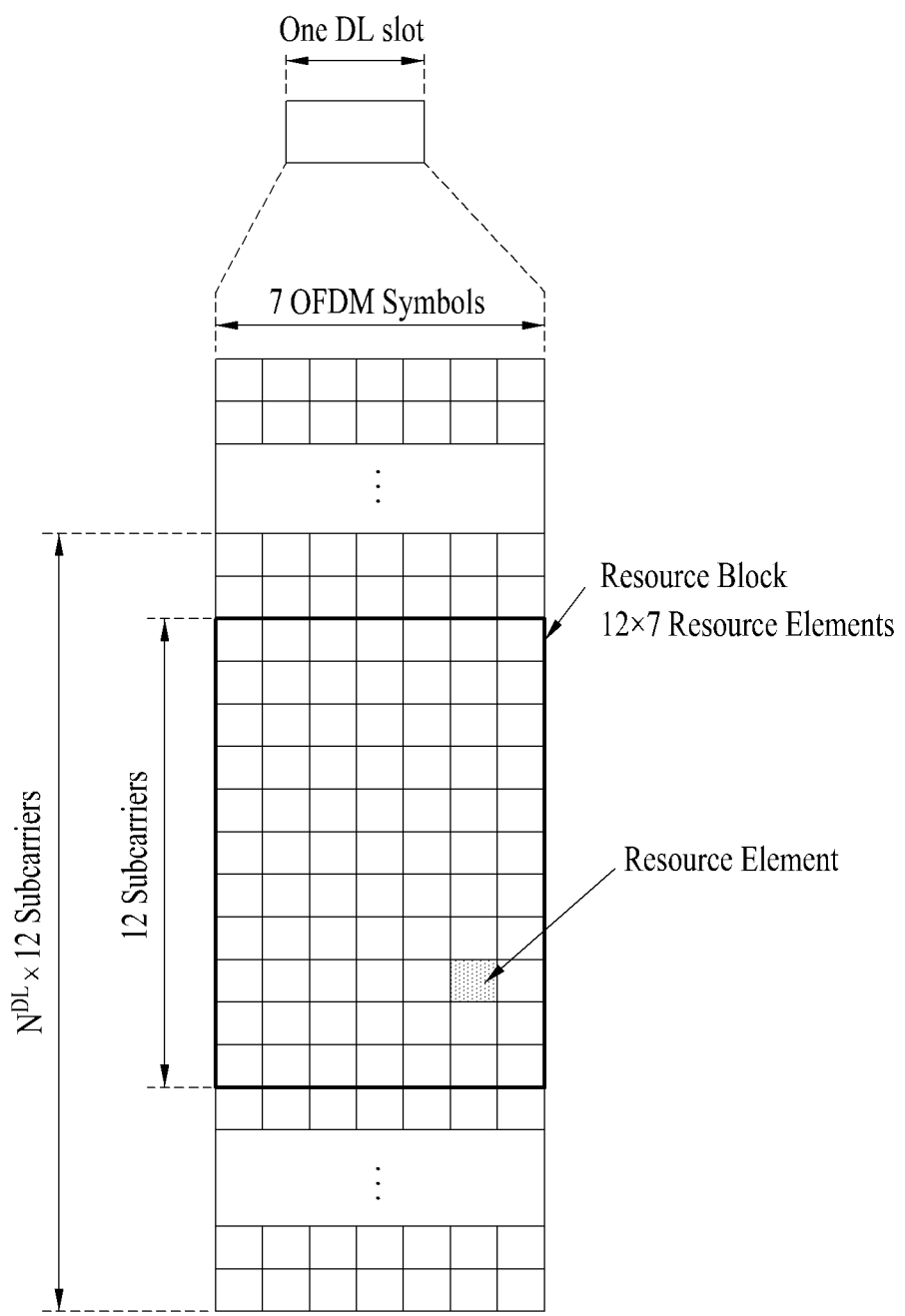
FIG. 2 is a diagram of a resource grid in a downlink slot.

FIG. 2 is a diagram of a resource grid in a downlink (DL) slot. One downlink (DL) slot may include 7 OFDM symbols in a time domain and one resource block (RB) may include 12 subcarriers in a frequency domain, by which the present invention may be non-limited. For instance, in case of a normal cyclic prefix (CP), one slot includes 7 OFDM symbols. Yet, in case of an extended CP, one slot may include 6 OFDM symbols. Each element on a resource grid may be named a resource element (hereinafter abbreviated RE). One resource block includes 12×7 resource elements. The number $N^{DL}$ of resource blocks included in a DL slot may depend on a DL transmission bandwidth. And, the structure of an uplink (UL) slot may be identical to that of the DL slot.

Figure 3:
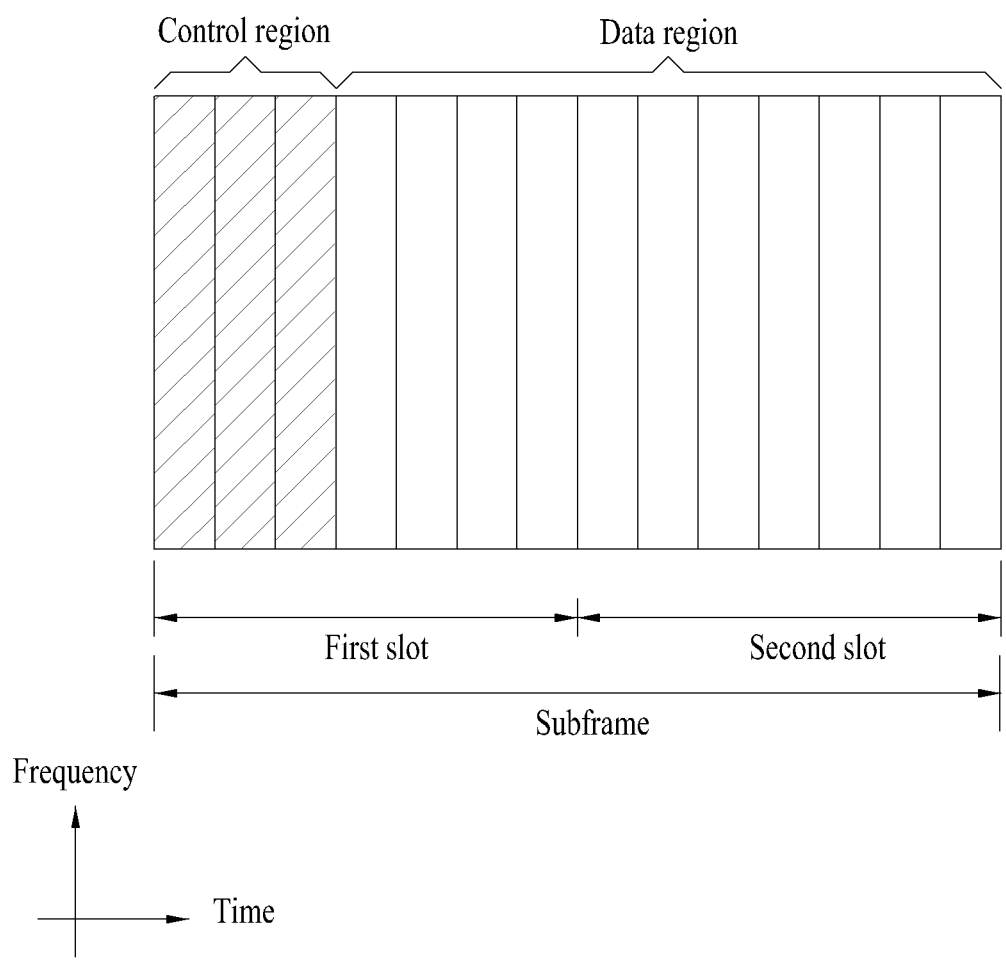
FIG. 3 is a diagram for a structure of a downlink subframe.

FIG. 3 is a diagram for a structure of a downlink (DL) subframe. Maximum 3 OFDM symbols situated in a head part of a first slot of one subframe correspond to a control region to which a control channel is assigned. The rest of OFDM symbols correspond to a data region to which PDSCH (physical downlink shared channel) is assigned. Examples of DL control channels used by 3GPP LTE system may include PCFICH (Physical Control Format Indicator Channel), PDCCH (Physical Downlink Control Channel), PHICH (Physical hybrid automatic repeat request indicator Channel) and the like.

The PCFICH is transmitted in a first OFDM symbol of a subframe and includes information on the number of OFDM symbols used for a transmission of a control channel within the subframe.

The PHICH includes HARQ ACK/NACK signal in response to a UL transmission.

The PDCCH carries a downlink control information (DCI). The DCI may include UL or DL scheduling information or an uplink transmission power control command for a random UE (user equipment) group depending on a format.

PDCCH Processing

In transmitting DCI on PDCCH, CRC (cyclic redundancy check) is attached to the DCI. In doing so, the DCI is masked with a radio network temporary identifier (RNTI). In this case, the RNTI may include an RNTI differing for the purpose of transmission of DCI. In particular, P-RNTI may be usable for a paging message related to a network initiated connection setup. RA-RNTI may be usable for a case related to a random access. SI-RNTI may be usable for a system information block (SIB). Moreover, in case of a unicast transmission, a unique UE identifier 'C-RNTI' is usable. The CRC attached DCI is encoded into prescribed codes and is then adjusted to be suitable for a size of resource used for a transmission through a rate-matching.

In the above-mentioned PDCCH transmission, when PDCCH is mapped to REs, contiguous logical assignment unit 'control channel element (CCE)' is used for efficient processing. CCE consists of 36 REs, which corresponds to 9 REG (resource element group) units. The number of CCEs required for specific PDCCH varies depending on a DCI payload (i.e., control information size), a cell bandwidth, a channel coding rate and the like. In particular, the number of CCEs for specific PDCCH can be defined according to PDCCH format shown in Table 1.

TABLE 1

| PDCCH format | No. of CCE | No. of REG | PDCCH bit No. |
|---|---|---|---|
| 0 | 1 | 9 | 72 |
| 1 | 2 | 18 | 144 |
| 2 | 4 | 36 | 288 |
| 3 | 8 | 72 | 576 |

Referring to Table 1, the number of CCEs varies depending on a PDCCH format. For instance, while a transmitting side uses PDCCH format 0, if a channel state becomes poor, the current format is changed into PDCCH format 2. Thus, the PDCCH format can be used adaptively.

Blind Decoding

For PDCCH, as mentioned in the foregoing description, one of 4 kinds of formats is usable, which is not notified to a user equipment. Hence, the user equipment should perform a decoding without being aware of the PDCCH format, which is called a blind decoding. Yet, if the user equipment decodes all possible CCEs used in DL for each PDCCH format, it puts a considerable burden on the user equipment. Hence, a search space is defined in consideration of restriction on a scheduler and a decoding attempt count.

In particular, a search space is a set of PDCCH candidates consisting of CCEs on which the user equipment should attempt to perform a decoding. In this case, the aggregation level and the number of PDCCH candidates can be defined as Table 2.

TABLE 2

| | Search space | | |
|---|---|---|---|
| | Aggregation level | Size (CCE unit) | No. of PDCCH candidates |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to Table 2, since there are 4 kinds of aggregation levels, a user equipment has a plurality of search spaces in accordance with each aggregation level.

Moreover, the search space, as shown in Table 2, can be divided into a UE-specific search space and a common search space. The UE-specific search space is provided for specific user equipments. Each of the specific user equipments checks an RNTI masked on PDCCH and a CRC thereof by monitoring a UE-specific search space (e.g., attempting to decode a PDCCH candidate set in accordance with a possible DCI format). If the check is valid, each of the specific user equipments can obtain control information.

The common search space is provided for a case (e.g., a dynamic scheduling on system information, a paging message, etc.) that a plurality of user equipments or all user equipments need to receive PDCCH. Yet, the common search space may be used for a specific user equipment for the purpose of resource management. Meanwhile, the common search space may overlap the UE-specific search space.

Figure 4:
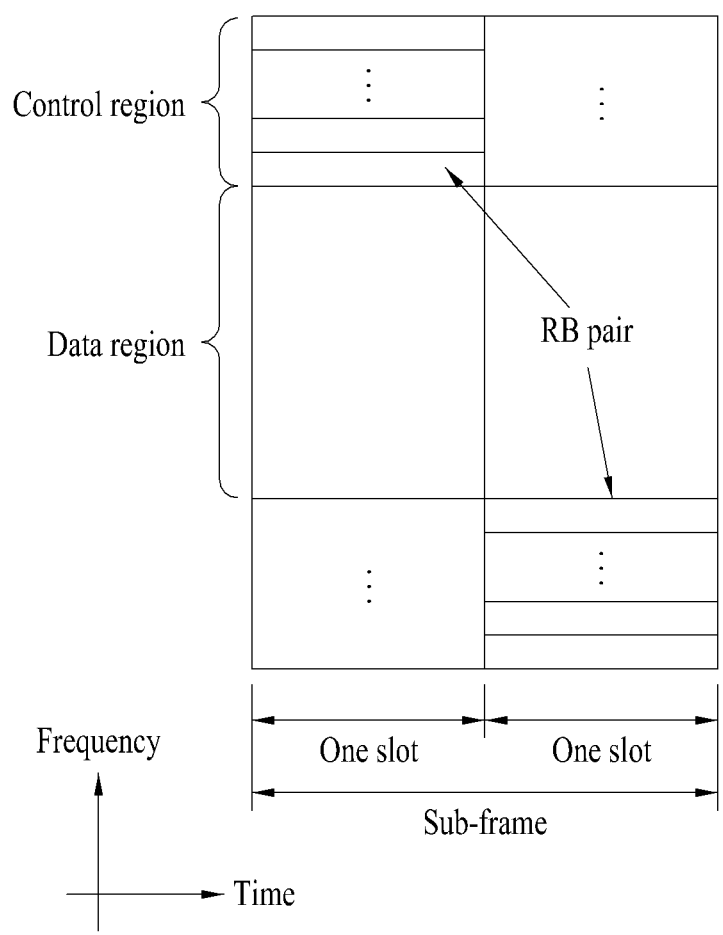
FIG. 4 is a diagram for a structure of an uplink subframe.

FIG. 4 is a diagram for a structure of an uplink (UL) subframe. A UL subframe may be divided into a control region and a data region in a frequency domain. A physical UL control channel (PUCCH) including UL control information may be assigned to the control region. And, a physical UL shared channel (PUSCH) including user data may be assigned to the data region. In order to maintain single carrier property, one user equipment does not transmit PUCCH and PUSCH simultaneously. PUCCH for one user equipment may be allocated to a resource block pair (RB pair) in a subframe. Resource blocks belonging to the resource block pair may occupy different subcarriers for 2 slots. Namely, a resource block pair allocated to PUCCH is frequency-hopped on a slot boundary.

Physical Uplink Control Channel (PUCCH)

Uplink control information (UCI) carried on PUCCH may include scheduling request (SR), HARQ ACK/NACK information and downlink channel measurement information.

HARQ ACK/NACK information may be generated by depending on whether decoding of UL data packet on PDSCH is successfully completed. In a conventional wireless communication system, 1 bit is transmitted as ACK/NACK information for a DL single codeword transmission or 2 bits are transmitted as ACK/NACK information for a DL 2-codeword transmission.

Channel measurement information means feedback information related to MIMO (multiple input multiple output) scheme and may include a channel quality indicator (CQI), a precoding matrix index IPMI) and a rank indicator (RI). Theses channel measurement information may be commonly represented as CQI. For the transmission of CQI, 20 bits per subframe may be used.

PUCCH may be modulated using BPSK (binary phase shift keying) and QPSK (quadrature phase shift keying). Control information on a plurality of user equipments may be transmitted on PUCCH. When Code Division Multiplexing (CDM) is performed in order to identify signals of a plurality of the user equipments, 12 CAZAC (Constant Amplitude Zero Autocorrelation) sequences are mainly used. Since CAZAC sequence has the property of maintaining a constant amplitude in time domain or frequency domain, the CAZAC sequence is most appropriate for decreasing a PAPR (Peak-to-Average Power Ratio) or CM (Cubic Metric) of a user equipment so as to increase a coverage. And, ACK/NACK information on a transmission of downlink data, which is transmitted on PUCCH, may be covered using an orthogonal sequence.

Control information transmitted on PUCCH may be identified using cyclically shifted sequences including different cyclic shift values. The cyclically shifted sequence may be generated by cyclically shifting a base sequence by a specific CS (cyclic shift) amount. The specific CS amount is indicated by a cyclic shift (CS) index. The number of available cyclic shifts may vary by depending upon a delay spread of a channel. One of sequences of various types may be used as the base sequence. And, the aforementioned CAZAC sequence is one example of those sequences.

A size of control information, which can be transmitted in one subframe by a user equipment, may be determined in accordance with the number of SC-FDMA symbols (i.e., SC-FDMA symbols except SC-FDMA symbol used for a reference signal (RS) transmission for a coherent detection of PUCCH) available for a transmission of the control information.

PUCCH format 1 is used for an independent transmission of SR (scheduling request). In case of the SR independent transmission, a non-modulated waveform is applicable. This shall be described in detail later.

PUCCH format 1a or PUCCH format 1b is used for a transmission of HARQ ACK/NACK. In case that HARQ ACK/NACK is independently transmitted in a random subframe, it may be able to use PUCCH format 1a or PUCCH format 1b. Moreover, both HARQ ACK/NACK and SR may be transmitted in a same subframe using PUCCH format 1a or PUCCH format 1b.

PUCCH format 2 is used for a transmission of CQI. PUCCH format 2a or PUCCH format 2b is used for a transmission of CQI and HARQ ACK/NACK. In case of an extended CP, PUCCH format 2 may be available for a transmission of CQI and HARQ/NACK.

Reference Signal (RS)

When a packet is transmitted in a wireless communication system, since the transmitted packet is transmitted on a radio channel, signal distortion may occur in the course of the transmission. In order for a receiving side to correctly receive the distorted signal, distortion in a received signal should be corrected using channel information. In order to acquire the channel information, after a signal known to both a receiving side and a transmitting side has been transmitted, the channel information can be acquired with a degree of distortion on receiving the signal on a channel. This signal may be called a pilot signal or a reference signal.

In case of transmitting and receiving data using multiple antennas (MIMO), a channel status between a transmitting antenna and a receiving antenna should be obtained to receive a correct signal. Hence, a separate reference signal needs to be present for each transmitting antenna.

Downlink reference signals may include a common reference signal (CRS) shared with all user equipments in a cell and a dedicated reference signal (DRS) for a specific user equipment only. By these reference signals, information for channel estimation and demodulation can be provided.

A receiving side (e.g., a user equipment) estimates a state of a channel from CRS and may be able to feed back such an indicator related to a channel quality as CQI (Channel Quality Indicator), PMI (Precoding Matrix Index) and RI (Rank Indicator) to a transmitting side (e.g., base station). The CRS may be called a cell-specific reference signal. An RS related to feedback of such channel state information (CSI) as CQI/PMI/RI can be separately defined as CSI-RS.

Meanwhile, DRS may be transmitted on a corresponding RE if demodulation of data on PDSCH is necessary. A user equipment many be informed of a presence or non-presence of DRS by an upper layer. In particular, the user may be informed that the DRS is valid only if the corresponding PDSCH is mapped. The DRS may be called a UE-specific reference signal or a demodulation reference signal (DMRS).

Cell-Specific Reference Signal (CRS)

CRS is used to estimate a channel of a physical antenna stage. The CRS is a reference signal receivable in common by all user equipments (UEs) in a cell and is distributed over a whole band. The CRS may be used for the purpose of channel state information (CSI) acquisition and data demodulation.

The CRS may be defined in various forms in accordance with antenna configuration. 3GPP LTE (e.g., Release-8) system supports various antenna configurations and a downlink signal transmitting side (e.g., base station) may have three kinds of antenna configurations including a single antenna, 2 transmitting antennas, 4 transmitting antennas and the like. In case that a base station performs a single antenna transmission, a reference signal for a single antenna port is arranged. In case that a base station performs 2-antenna transmission, reference signals for 2 antenna ports are arranged by time division multiplexing and/or frequency division multiplexing. In particular, the reference signals for 2 antenna ports are arranged on different time resources and/or different frequency resources to be discriminated from each other. In case that a base station performs 4-antenna transmission, reference signals for 4 antenna ports are arranged by TDM/FDM.

Channel information estimated via CRS by a downlink signal receiving side (e.g., user equipment) may be used for demodulation of data transmitted by such a transmission scheme as Single Antenna Transmission, Transmit diversity, Closed-loop Spatial multiplexing, Open-loop Spatial multiplexing, Multi-User MIMO (MU-MIMO) and the like.

In case that MIMO is supported, when a reference signal is transmitted from a prescribed antenna port, a reference signal is carried at a resource element (RE) position designated by a reference signal pattern but no signal is carried at a resource element (RE) position designated for another antenna port.

CRS can be generated by Formula 1.

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{[Formula 1]}$$
$$m = 0, 1, \ldots, 2N_{RB}^{max,DL} - 1$$

In Formula 1, $n_s$ means a slot number, l means a symbol number in a slot, and c(i) means a pseudo random sequence.

A rule for mapping CRS on a resource block follows Formula 2.

$$k = 6m + (v + v_{shift}) \bmod 6 \quad \text{[Formula 2]}$$

$$l = \begin{cases} 0, N_{symb}^{DL} - 3, & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

Figure 5:
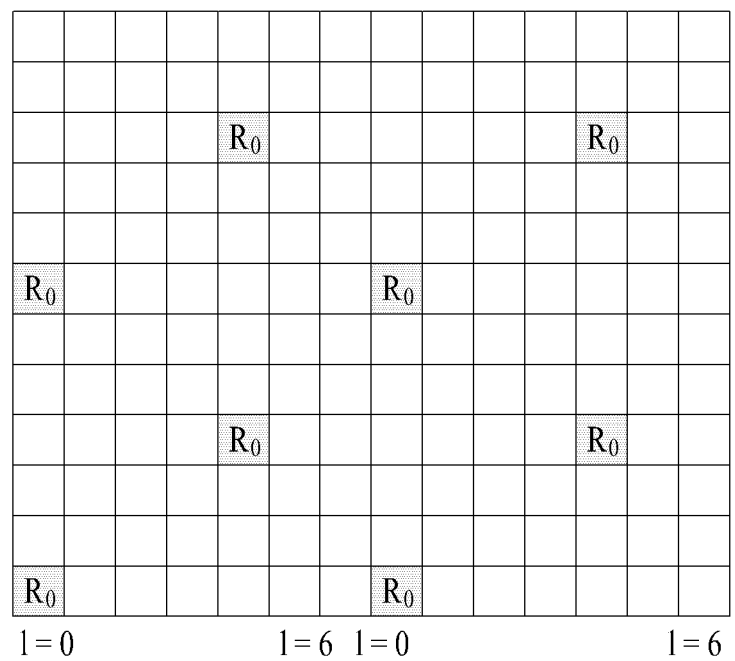
FIG. 5 is a diagram of a cell-specific reference signal.

In Formula 2, k indicates a subcarrier index, l indicates a symbol index, and p indicates an antenna port index. $N_{symb}^{DL}$ indicates the number of OFDM symbols of one downlink slot, $N_{RB}^{DL}$ indicates the number of resource blocks allocated to downlink, $n_s$ indicates a slot index, and $N_{ID}^{cell}$ indicates a cell ID. 'mod' means a modulo operation. A position of a reference signal in frequency domain depends on a value of $V_{shift}$. Since the $V_{shift}$ value depends on a cell ID as well, a position of a reference signal has a frequency shift value different per cell. FIG. 5 shows that CRS is mapped to RB at antenna port 0 if there is a single antenna port, by the above-mentioned formula.

A position in frequency domain may be set to differ by being shifted in order to raise channel estimation performance through CRS. For instance, if a reference signal is situated at every 3 subcarriers, a prescribed cell enables the reference signal to be arranged on a subcarrier of 3k and another cell enables the reference signal to be arranged on a subcarrier of 3k+1. In viewpoint of one antenna port, a reference signal is arranged by 6-RE interval (i.e., 6-subcarrier interval) in frequency domain and maintains 3-RE interval in frequency domain from an RE on which a reference signal for another antenna port is arranged.

For the CRS, power boosting may be applicable. In this case, the power boosting means that a reference signal is transmitted with higher power in a manner of bringing power not from an RE allocated for the reference signal but from another RE among resource elements (REs) of one OFDM symbol.

A reference signal position in time domain is arranged by a predetermined interval by setting symbol index (l) 0 of each slot to a start point. A time interval is defined different in accordance with a CP length. In case of a normal CP, a reference signal is situated at a symbol index 0 of a slot and a reference signal is situated at a symbol index 4 of the slot. Reference signals for maximum 2 antenna ports are defined on one OFDM symbol. Hence, in case of 4-transmitting antenna transmission, reference signals for antenna ports 0 and 1 are situated at symbol indexes 0 and 4 (or symbol indexes 0 and 3 in case of an extended CP) of a slot, respectively and reference signals for antenna ports 2 and 3 are situated at symbol index 1 of the slot. Yet, frequency positions of the reference signals for the antenna ports 2 and 3 may be switched to each other in a $2^{nd}$ slot.

Channel State Information Reference Signal (CSI-RS)

CSI-RS is provided for LTE-A system supportive of maximum 8 antenna ports in downlink and is a reference signal for the purpose of channel measurement. This is different from a fact that CRS is provided for the purpose of channel measurement and data demodulation. Hence, it may be unnecessary for the CSI-RS to be transmitted in each subframe like CRS. The CSI-RS is used in transmission mode 9. And, DMRS is transmitted for data demodulation.

CSI-RS is described in detail as follows. First of all, CSI-RS can be transmitted through a, 2, 4 or 8 antenna ports. In case of 1 antenna port, antenna port #15 is usable. In case of 2 antenna ports, antenna port #15 and antenna port #16 are usable. In case of 4 antenna ports, antenna ports #15 to #18 are usable. In case of 8 antenna ports, antenna ports #15 to #22 are usable.

CSI-RS can be generated using Formula 3.

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{[Formula 3]}$$
$$m = 0, 1, \ldots, N_{RB}^{max,DL} - 1$$

In Formula 3, $r_{l,n_s}(m)$ means a generated CSI-RS, C(i) means a pseudo random sequence, $n_s$ means a slot number, l means an OFDM symbol, and $N_{RB}^{max,DL}$ means a maximum RB number of a downlink bandwidth.

The CSI-RS generated by Formula 1 can be mapped to RE per antenna port using Formula 4.

$$a_{k,l}^{(p)} = w_{l''} \cdot r_{l,n_s}(m') \quad \text{[Formula 4]}$$

$$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

-continued $$l = l' + \begin{cases} l'' & \text{CSI reference signal configurations 0-19,} \\ & \text{normal cyclic prefix} \\ 2l'' & \text{CSI reference signal configurations 20-31,} \\ & \text{normal cyclic prefix} \\ l'' & \text{CSI reference signal configurations 0-27,} \\ & \text{extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Formula 4, k' and l' can be determined in accordance with CSI-RS configuration shown in Table 3.

TABLE 3

|  | CSI reference signal configuration | Number of CSI reference signals configured | | | | | |
|---|---|---|---|---|---|---|---|
|  |  | 1 or 2 | | 4 | | 8 | |
|  |  | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
|  | 1 | (11, 2) | 1 | (11, 2) | 1 | (11, 2) | 1 |
|  | 2 | (9, 2) | 1 | (9, 2) | 1 | (9, 2) | 1 |
|  | 3 | (7, 2) | 1 | (7, 2) | 1 | (7, 2) | 1 |
|  | 4 | (9, 5) | 1 | (9, 5) | 1 | (9, 5) | 1 |
|  | 5 | (8, 5) | 0 | (8, 5) | 0 |  |  |
|  | 6 | (10, 2) | 1 | (10, 2) | 1 |  |  |
|  | 7 | (8, 2) | 1 | (8, 2) | 1 |  |  |
|  | 8 | (6, 2) | 1 | (6, 2) | 1 |  |  |
|  | 9 | (8, 5) | 1 | (8, 5) | 1 |  |  |
|  | 10 | (3, 5) | 0 |  |  |  |  |
|  | 11 | (2, 5) | 0 |  |  |  |  |
|  | 12 | (5, 2) | 1 |  |  |  |  |
|  | 13 | (4, 2) | 1 |  |  |  |  |
|  | 14 | (3, 2) | 1 |  |  |  |  |
|  | 15 | (2, 2) | 1 |  |  |  |  |
|  | 16 | (1, 2) | 1 |  |  |  |  |
|  | 17 | (0, 2) | 1 |  |  |  |  |
|  | 18 | (3, 5) | 1 |  |  |  |  |
|  | 19 | (2, 5) | 1 |  |  |  |  |
| Frame structure type 2 only | 20 | (11, 1) | 1 | (11, 1) | 1 | (11, 1) | 1 |
|  | 21 | (9, 1) | 1 | (9, 1) | 1 | (9, 1) | 1 |
|  | 22 | (7, 1) | 1 | (7, 1) | 1 | (7, 1) | 1 |
|  | 23 | (10, 1) | 1 | (10, 1) | 1 |  |  |
|  | 24 | (8, 1) | 1 | (8, 1) | 1 |  |  |
|  | 25 | (6, 1) | 1 | (6, 1) | 1 |  |  |
|  | 26 | (5, 1) | 1 |  |  |  |  |
|  | 27 | (4, 1) | 1 |  |  |  |  |
|  | 28 | (3, 1) | 1 |  |  |  |  |
|  | 29 | (2, 1) | 1 |  |  |  |  |
|  | 30 | (1, 1) | 1 |  |  |  |  |
|  | 31 | (0, 1) | 1 |  |  |  |  |

Figure 6:
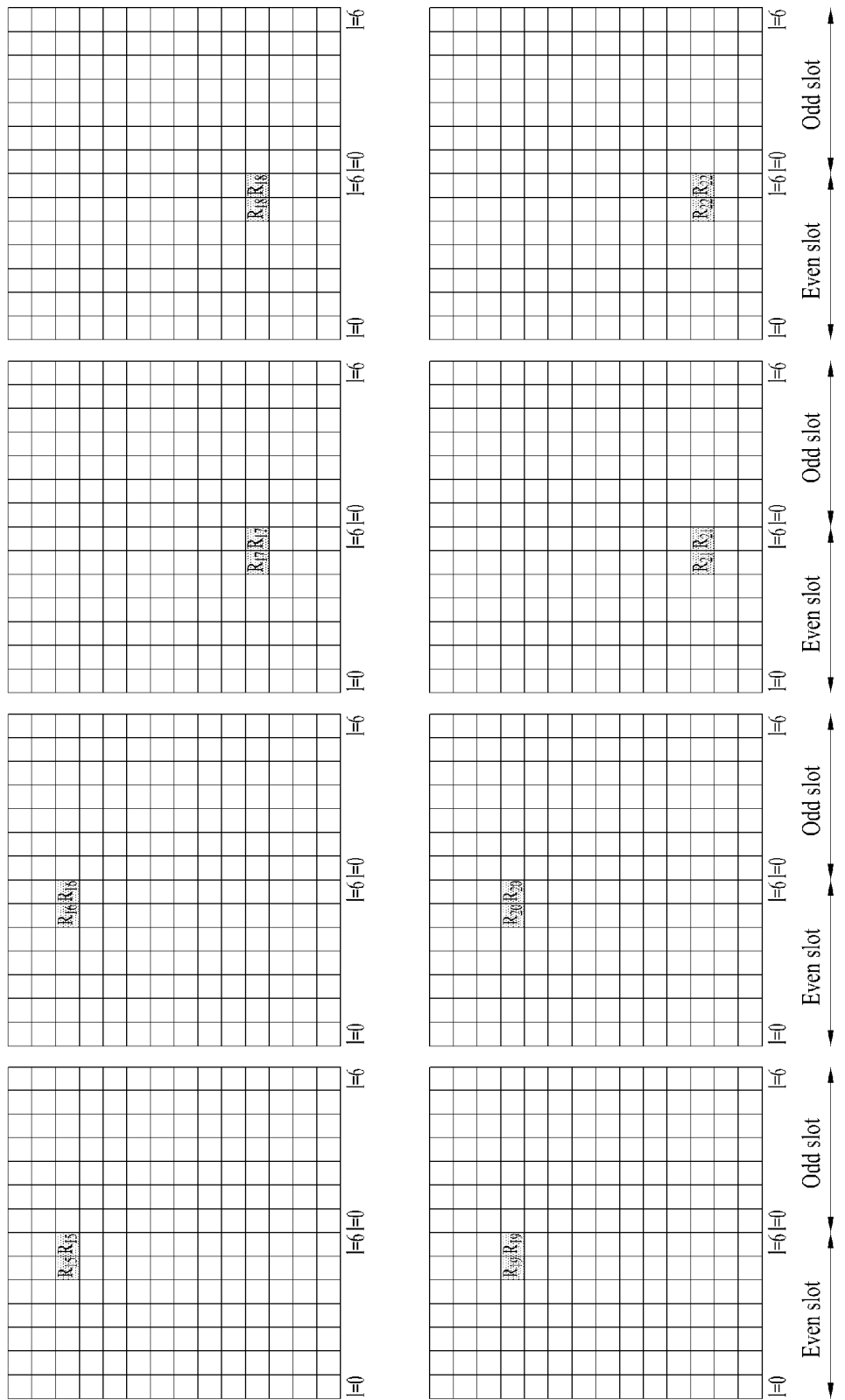
FIG. 6 is a diagram of a channel state information reference signal.

By Formula 4 and Table 3, CSI-RS is amped to RE per antenna port in specific CSI-RS configuration. For instance, in case of CSI-RS configuration 0, it can be performed as shown in FIG. 6.

Moreover, as mentioned in the foregoing description, CSI-RS can be transmitted not in each subframe but in a specific subframe. In particular, CSI-RS can be transmitted in a subframe, which meets Formula 5, by referring to CSI-RS subframe configuration shown in Table 4.

TABLE 4

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$-5 |
| 15-34 | 20 | $I_{CSI-RS}$-15 |
| 35-74 | 40 | $I_{CSI-RS}$-35 |
| 75-154 | 80 | $I_{CSI-RS}$-75 |

$$(10n_f + \lfloor n_s/2 \rfloor - \Delta_{CSI-RS}) \bmod T_{CSI-RS} = 0 \qquad \text{[Formula 5]}$$

In Table 4, $T_{CSI-RS}$ means CSI-RS transmitted periodicity, $\Delta_{CSI-RS}$ means an offset value, $n_f$ means a system frame number, and $n_s$ means a slot number.

Sounding Reference Signal (SRS)

Sounding reference signal (SRS) is mainly used for a base station to perform a frequency-selective scheduling in UL by performing a channel quality measurement and is not associated with UL data and/or control information transmission, by which the sounding reference signal is non-limited. And, the SRS may be usable for the purpose of an improved power control or for the purpose of supporting various start-up functions of recently unscheduled user equipments. For example, the start-up functions may include an initial modulation and coding scheme (MCS), an initial power control for data transmission, a timing advance and frequency half-selective scheduling (e.g., a scheduling performed in a manner that a frequency resource is selectively allocated in a $1^{st}$ slot of a subframe but that a frequency resource pseudo-randomly hops into another frequency in a $2^{nd}$ slot of the subframe), and the like.

The SRS may be usable for a DL channel quality measurement on the assumption that a radio channel is reciprocal between UL and DL. This assumption is particularly effective to a TDD (time division duplex) system in which a UL and a DL share the same frequency band with each other but are discriminated from each other in time domain.

A subframe in which SRS is transmitted by a random user equipment within a cell is indicated by cell-specific broadcast signaling. A 4-bit cell-specific parameter 'srsSubframeConfiguration' indicates 15 kinds of available configurations of a subframe for transmitting SRS within each radio frame. By this configuration, flexibility for adjusting an SRS overhead in accordance with a network arrangement scenario can be provided. A configuration of a remaining one ($16^{th}$) of the parameter is to completely switch off an SRS transmission within a cell and may be suitable for a cell that mainly serves fast user equipments for example.

SRS is always transmitted on a last SC-FDMA symbol of a configured subframe. Hence, SRS and DMRS (demodulation reference signal) are located on different SC-FDMA symbols, respectively. PUSCH data transmission is not allowed to be performed on SC-FDMA symbol designated to SRS transmission. Hence, if a sounding overhead is highest (i.e., a case that an SRS transmission symbol exists in every subframe), it does not exceed about 7%.

Each SRS symbol is generated for a given time unit and frequency band by a basic sequence (e.g., a random sequence, a set of ZC-based (Zadoff Chu-based) sequences) and every user equipment within a cell uses the same basic sequence. In doing so, SRS transmissions from a plurality of user equipments within a cell on the same frequency band can be orthogonally identified by different cyclic shifts of the basic sequence assigned to a plurality of the user equipments, respectively. Although an SRS sequence of a different cell may be identifiable by assigning a different basic sequence to each cell, orthogonality between the different basic sequences are not guaranteed.

PSS (Primary Synchronous Signal)/SSS (Secondary Synchronous Signal)

Figure 7:
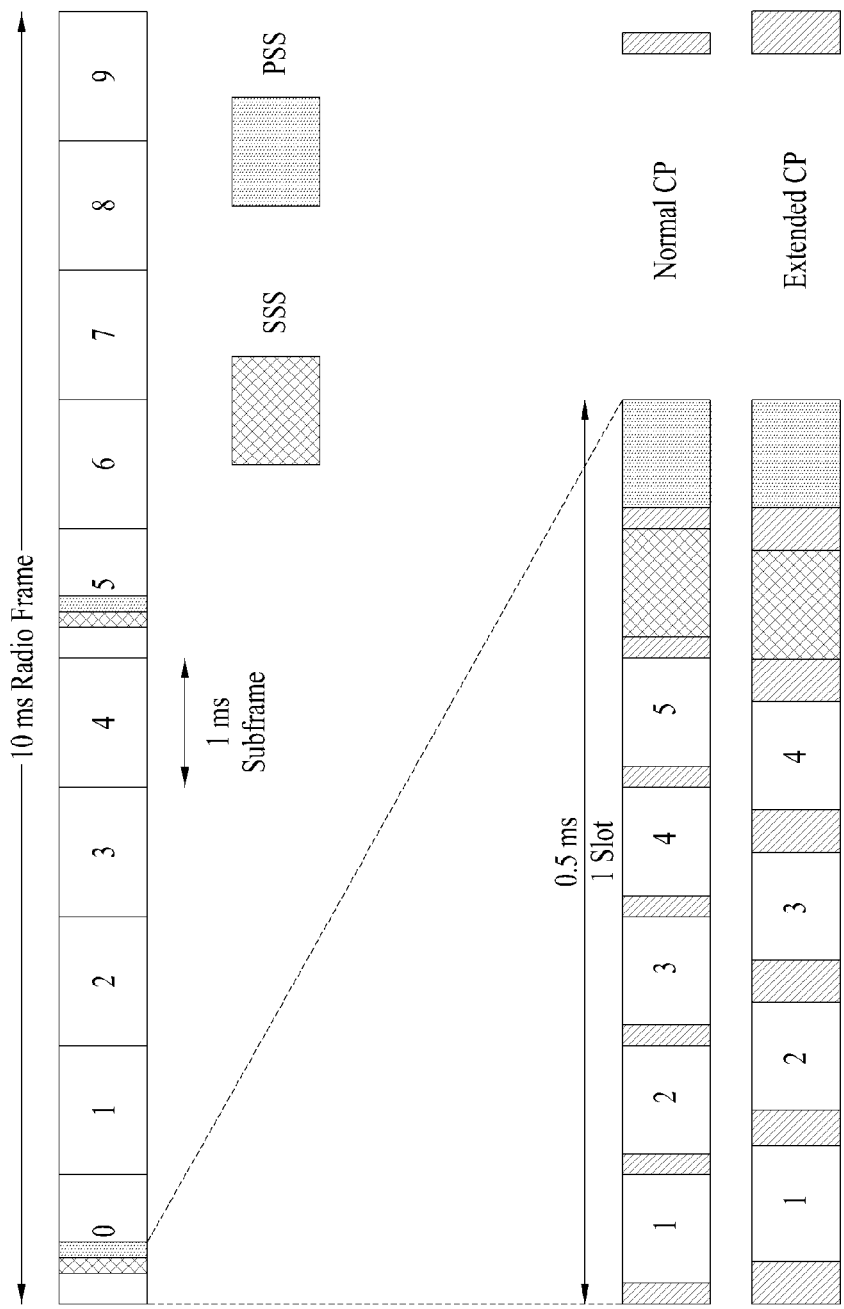
FIG. 7 is a diagram to describe a synchronization signal.

FIG. 7 is a diagram to describe PSS and SSS which are synchronous signals used for a cell search in LTE/LTE-A system. Prior to describing PSS and SSS, a cell search is described as follows. First of all, when a user equipment initially accesses a cell, a cell search is performed to perform a handover from a currently accessed cell to another cell or a cell reselection. And, the cell search can include frequency and symbol synchronization acquisition for a cell, downlink frame synchronization acquisition of a cell and cell identifier (ID) determination. 3 cell identifiers configure a single cell group and 168 cell groups can exist.

For the cell search, a base station transmits PSS and SSS. A user equipment obtains 5 ms timing of a cell by detecting PSS and is able to know about a cell identifier in a cell group. Moreover, the user equipment can know about a radio frame timing and a cell group by detecting SSS.

Referring to FIG. 7, PSS is transmitted in subframe #0 and subframe #5, and more particularly, on a last OFDM symbol of a $1^{st}$ slot in each of the subframe #0 and the subframe #5. SSS is transmitted on a last $2^{nd}$ OFDM symbol of the $1^{st}$ slot in each of the subframe #0 and the subframe #5. This transmission timing applies to the case of FCC. In case of TDD, PSSS is transmitted on a $3^{rd}$ symbol of each of subframe #1 and subframe #6, i.e., DwPTS. And, SSS is transmitted on a last symbol of each of the subframe #0 and the subframe #5. In particular, SSS is transmitted by 3 symbols ahead of PSS in TDD.

PSS is Zadoff-Chu sequence of a length 63. In real transmission, as both ends of the sequence are padded with 0, the sequence is transmitted on 73 subframes (72 subcarriers except DC subcarrier, i.e., 6 RBs) in the middle of a system frequency bandwidth. SSS consists of a sequence of length 62 resulting from frequency-interleaving 2 sequences of length 31. Like PSS, the SSS is transmitted on 72 subcarriers in the middle of a whole system bandwidth.

Carrier Aggregation

Figure 8:
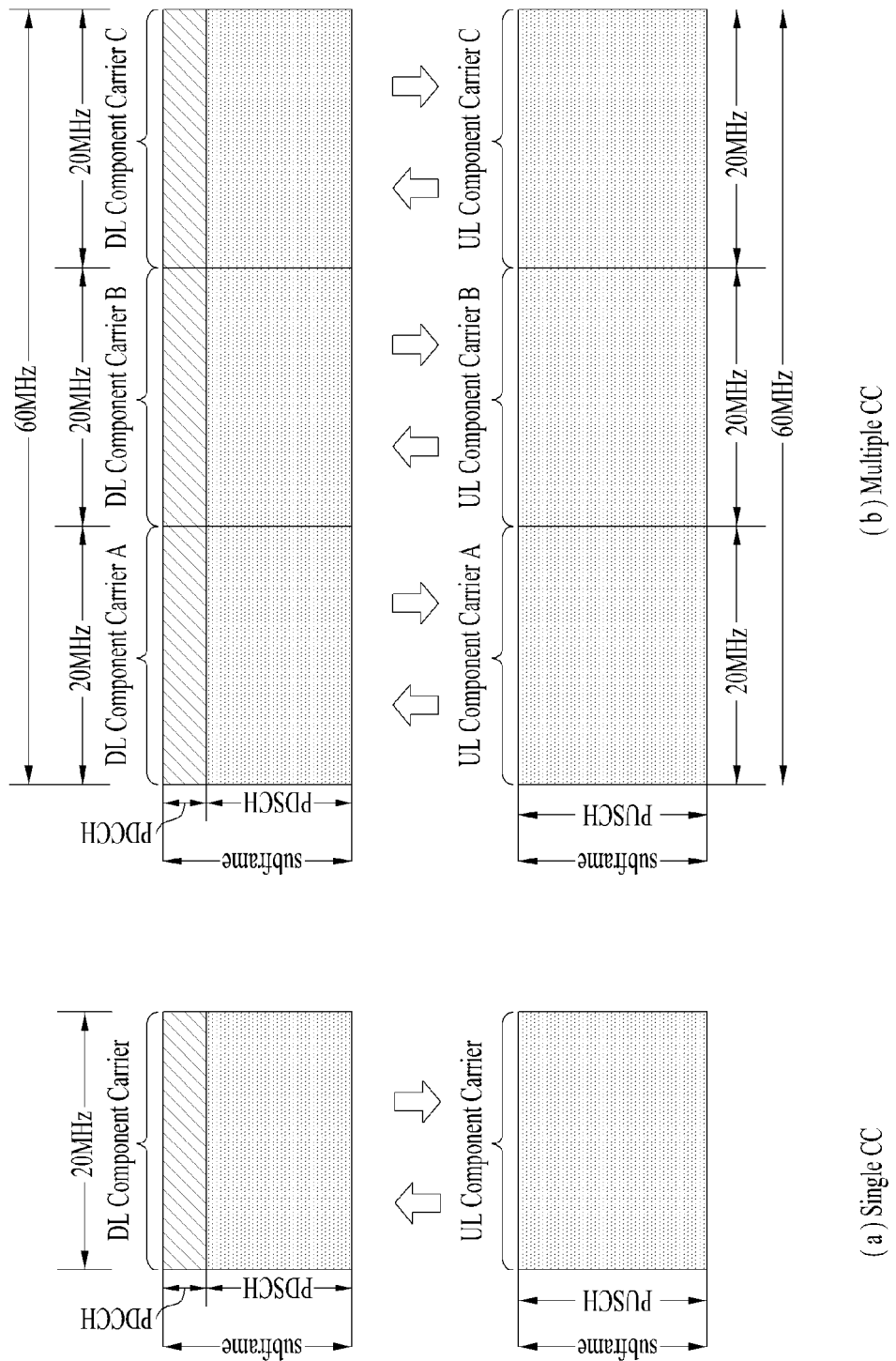
FIG. 8 is a diagram to describe carrier aggregation.

FIG. 8 is a diagram to describe carrier aggregation. Prior to describing carrier aggregation, the concept of a cell introduced to manage and control a radio resource in LTE-A is described as follows. First of all, a cell can be understood as combination of a DL resource and a UL resource. In this case, the UL resource is not an essential element. Hence, a cell can be configured with a DL resource only or both a DL resource and a UL resource. This is the current definition by LTE-A Release 10. On the contrary, a cell can be configured with a UL resource only. A DL resource can be named a DL component carrier (DL CC) and a UL resource can be named a UL component carrier (UL CC). DL CC and UL CC can be represented as carrier frequency. And, the carrier frequency means a center frequency in a corresponding cell.

Cells can be classified into a primary cell (PCell) operating on a primary frequency and a secondary cell (SCell) operating on a secondary frequency. PCell and SCell can be commonly named a serving cell. A cell, which is indicated when a user equipment performs an initial connection establishment process, a connection re-establishment process or a handover process, can become the PCell. In particular, the PCell can be understood as a cell that becomes a control related center in a carrier aggregation environment that will be described later. A user equipment can receive assignment of PUCCH in its PCell and is then able to transmit the PUCCH. The SCell can be configured after completion of RRC (radio resource control) connection establishment and may be used to provide an additional radio resource. In the carrier aggregation environment, a serving cell except PCell may be regarded as SCell. If carrier aggregation is not configured for a user equipment in RRC_CONNECTED state or a user equipment in RRC_CONNECTED state does not support carrier aggregation, there exists a single serving cell configured with PCell only. On the other hand, if carrier aggregation is configured for a user equipment in RRC_CONNECTED state, at least one or more serving cells exist. And, PCell and all SCells are included in the entire serving cells. For a user equipment supportive of carrier aggregation, a network can configure at least one SCell in addition to PCell initially configured in the connection establishment process after initiation of an initial security activation process.

In the following description, carrier aggregation is explained with reference to FIG. 8. First of all, carrier aggregation is the technology introduced to enable a wider band to be used in order to meet the demand for a high and fast transmission rate. Carrier aggregation may be defined as an aggregation of at least two component carriers (CCs) differing from each other in carrier frequency. Referring to FIG. 8, FIG. 8 (a) shows a subframe in case that a single CC is used in a legacy LTE system. FIG. 8 (b) shows one example that 3 CCs on 20 MHz are used to support a bandwidth of total 60 MHz. In this case, the CCs may be contiguous or non-contiguous.

A user equipment can simultaneously receive and monitor DL data through a plurality of DL CCs. A linkage between each DL CC and UL CC can be indicated by system information. DL CC/UL CC link may be fixed to a system or configured semi-statically. Moreover, even if a whole system band is configured with N CCs, a frequency band which can be monitored/received by a specific user equipment may be limited to M (<N) CCs. Various parameters for carrier aggregation may be set by a cell-specific, UE group-specific or UE-specific method.

Figure 9:
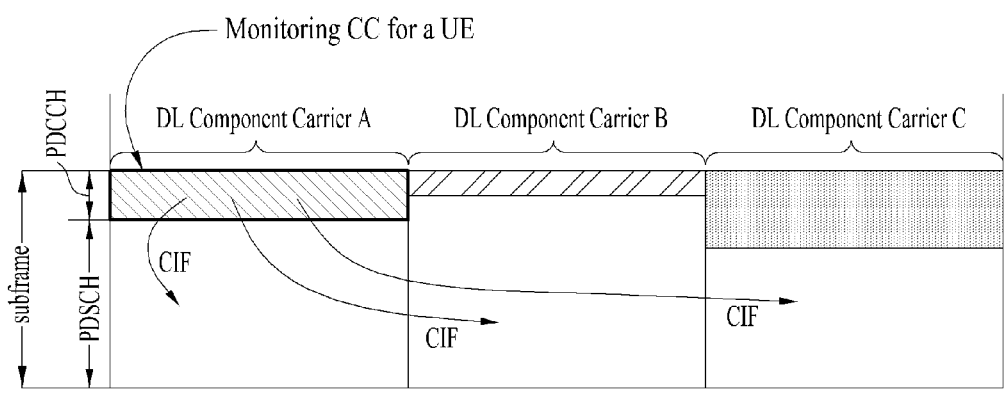
FIG. 9 is a diagram to describe cross carrier scheduling.

FIG. 9 is a diagram to describe cross carrier scheduling. First of all, cross carrier scheduling means that a control region of DL CC of one of a plurality of serving cells includes all DL scheduling assignment information of another DL CC or that a control region of DL CC of one of a plurality of serving cells includes all UL scheduling grant information on a plurality of DL CCs linked to the corresponding DL CC.

A carrier indicator field (CIF) is described as follows.

First of all, as mentioned in the foregoing description, CIF may or may not be included in a DCI format transmitted on PDCCH. If the CIF is included therein, it indicates that cross carrier scheduling is applied. In case that cross carrier scheduling is not applied, DL scheduling assignment information is valid on DL CC on which current DL scheduling assignment information is carried. Moreover, a UL scheduling grant is valid for one UL CC linked to DL CC on which DL scheduling assignment information is carried.

If cross carrier scheduling is applied, it indicates a CC related to DL scheduling assignment information carried on PDCCH in a prescribed DL CC. For instance, referring to FIG. 9, DL assignment information on DL CC B and DL CC C, i.e., information on PDSCH resource is transmitted through PDCCH in a control region on DL CC A. A user equipment can recognize a resource region of PDSCH and a corresponding CC through CIF by monitoring the DL CC A.

Whether CIF is included in PDCCH or not can be set semi-static and can be enabled UE-specifically by upper layer signaling. If the CIF is disabled, PDCCH on a specific DL CC allocates a PDSCH resource on the same DL CC and is able to allocate PUSCH resource on UL CC linked to the specific DL CC. In this case, the same coding scheme, CCE based resource mapping and DCI format of an existing PDCCH structure are applicable thereto.

On the contrary, if the CIF is enabled, PDCCH on a specific DL CC can allocate PDSCH/PUSCH resource on a single DL/UL CC indicated by the CIF among a plurality of aggregated CCs. In this case, the CIF can be additionally defined in an existing PDCCH DCI format. For instance, the CIF may be defined as a field having a fixed 3-bit length or a CIF location may be fixed irrespective of a DCI format size. In this case, the same coding scheme, CCE based resource mapping and DCI format of an existing PDCCH structure are applicable thereto.

Although CIF exists, a base station is able to assign DL CC set to monitor PDCCH. Hence, it is able to reduce the burden put on blind decoding of a user equipment. A PDCCH monitoring CC set may include a prescribed portion of all aggregated DL CCs and the user equipment can perform detection/decoding of PDCCH on the corresponding CC set only. In particular, in order to schedule PDSCH/PUSCH for the user equipment, the base station can transmit PDCCH on the PDCCH monitoring CC set only. In this case, a PDCCH monitoring DL CC set may be configured UE-specific, UE group-specific or cell-specific. For instance, in case that 3 DL CCs are aggregated, as shown in FIG. 9, DL CC A can be set as the PDCCH monitoring DL CC. If the CIF is disabled, PDCCH on each DL CC can schedule PDSCH on DL CC A only. On the other hand, if the CIF is enabled, the PDCCH on the DL CC A is able to schedule PDSCH on another DL CC as well. In case that the DL CC A is set as the PDCCH monitoring CC, PDSCCH is not transmitted on DL CC B and DL CC C.

In a system to which the above-described carrier aggregation is applied, a user equipment is able to receive a plurality of PDSCHs through a plurality of DL carriers. In doing so, it may happen that the user equipment should transmit ACL/NACK for each data on a single UL CC in a single subframe. In case of transmitting a plurality of ACKs/NACKs in a single subframe using PUCCH format 1a/1b, a high transmission power is required, PAPR of a UL transmission increases, and a transmittable distance from a base station of the user equipment may decrease due to an inefficient use of a transmission power amplifier. In order to transmit a plurality of ACKs/NACKs on a single PUCCH, ACK/NACK bundling or ACK/NACK multiplexing may be applicable thereto.

On the other hand, it may happen that ACK/NACK information on numerous DL data according to application of carrier aggregation and/or ACK/NACK information on numerous DL data transmitted in a plurality of DL subframes in TDD system should be transmitted on PUCCH in a single subframe. In doing so, if ACK/NACK bits to be transmitted are more than the number supportable through the ACK/NACK bundling or the ACK/NACK multiplexing, it is unable to transmit the ACK/NACK information correctly by the above-described methods.

In the following description, based on the above descriptions, a method for a user equipment to acquire synchronization on an extension carrier, and more particularly, on a DL extension carrier (or a method for a base station to transmit a synchronous signal) is explained.

A DL extension carrier is described as follows.

First of all, an extension carrier means a carrier accessible/usable by a user equipment having a new function unlike the fact that a carrier is used by a user equipment in LTE/LTE-A Release 8/9/10 in the above-mentioned carrier aggregation. This may be understood as user equipments having capability different from UE capability currently defined in LTE/LTE-A system are allowed to access/use carriers. Since resource allocation information can be scheduled by PDCCH transmitted on a carrier having backward compatibility, the extension carrier may not carry L1/L2 control signal. In particular, since resources required for PCFICH, PHICH and PDCCH transmissions can be utilized for PDSCH transmission, it is able to raise spectral efficiency in aspect of frequency. Moreover, the extension carrier may not carry PBCH, PSS/SSS, CRS and the like as well as the above-mentioned control signal.

An extension carrier may be used for interference mitigation in a heterogeneous network environment or the like. In particular, in the legacy LTE/LTE-A system, the concept of ABS (almost blank subframe) is used for the interference mitigation. Yet, since a control channel and a CRS are transmitted in case of ABS as well, there may be some limitation put on trying to mitigate interference using the ABS. Hence, if ABS is configured on an extension carrier failing to carry a control channel and a CRS thereon and then used, it is able to raise the efficiency in interference mitigation.

An extension carrier can be used as the aforementioned SCell. In particular, carriers in the legacy LTE-LTE-A system can be used by being set as PCell and SCell, while an extension carrier is used by being set as SCell. In doing so, if the extension carrier is located on an intra-band adjacent on frequency to the carriers in the legacy LTE/LTE-A system, synchronization information of the adjacent carrier in can be utilized as synchronization information of the extension carrier. Yet, if the extension carrier is located on an inter-band distant on frequency from the carriers in the legacy LTE/LTE-A system, the synchronization information of the carrier in the legacy LTE/LTE-A system may not be exactly usable due to different propagation delay or different RF chain delay. Hence, such a case requires signaling for enabling a user equipment to acquire synchronization for the extension carrier, which is described in detail as follows.

In order for a user equipment to acquire synchronization for an extension carrier, it is able to transmit PSS/SSS and/or RS defined in the legacy LTE/LTE-A system. Yet, as mentioned in the foregoing description, since the extension carrier is assumed as accessed/used by a user equipment having a new function only, if the above-mentioned signals are transmitted in the same manner defined in the legacy LTE/LTE-A system, the existing user equipments may attempt initial accesses using the transmitted signals, which needs to be taken into consideration.

Above all, a transmission of a $1^{st}$ signal (PSS/SSS) transmitted to enable a user equipment to acquire synchronization for an extension carrier is described as follows.

First of all, PSS/SSS carried on an extension carrier can be transmitted in time and/or frequency region different from that of an existing region. In doing so, the different time and/or frequency region may be notified to a user equipment by upper layer signaling or correspond to a location previously agreed between a user equipment and a base station. In aspect of a frequency region, PSS/SSS carried on an extension carrier may include a different frequency region except 6 RBs in the middle of a whole bandwidth (i.e., at a center frequency). In this case, a designation of the corresponding region may be selected as x RB with reference to the center frequency, where x may be an arbitrary integer. And, the value of x may be delivered to the user equipment by upper layer signaling or the like. Alternatively, PSS/SSS carried on an extension carrier may be operational by being fixed to a region of which center frequency is not an integer multiple of a channel raster unit. In particular, a transmitted location of PSS/SSS carried on an extension carrier can include a random region except (100×n) kHz. In this case, a value except (100× n) kHz can be delivered from PCell through upper layer signaling. Alternatively, a channel raster for an extension carrier may be fixed to (100+n) kHz (e.g., 150 kHz, 115 kHz, 130 kHz, 85 kHz, 70 kHz, etc.).

Unlike the above description, referring to FIG. 10 (a), either PSS or SSS is transmitted on an extension carrier. Alternatively, referring to FIG. 10 (b), both of PSS and SSS are transmitted on an extension carrier in a manner of being transmitted in a single radio frame once only. Since a user equipment having an extension carrier configured therefor can be assumed as having a good channel state of a corresponding frequency band, it may be unnecessary to transmit both of PSS and SSS. And, it is apparent to those skilled in the art, to which the present invention pertains, that the principle similar to that of FIG. 10 is applicable to a case of an extended CP or TDD.

Referring to FIG. 10 (a), either PSS or SSS is transmitted in $1^{st}$ and $6^{th}$ subframes of a radio frame. In doing so, a user equipment, which will use an extension carrier, can acquire approximate synchronization through one of the PSS and the SSS. Yet, since an existing user equipment unable to use an extension carrier fails to receive each of the PSS and the SSS, it may not be able to acquire synchronization for an initial access for the extension carrier. Referring to FIG. 10 (b), as mentioned in the foregoing description, both of PSS and SSS are transmitted only in a $1^{st}$ subframe unlike a legacy system. This is just exemplary. And, the PSS and SSS can be transmitted in locations other than the drawing. For instance, both of the PSS and the SSS can be transmitted in the $6^{th}$ subframe of the radio frame.

Figure 11:
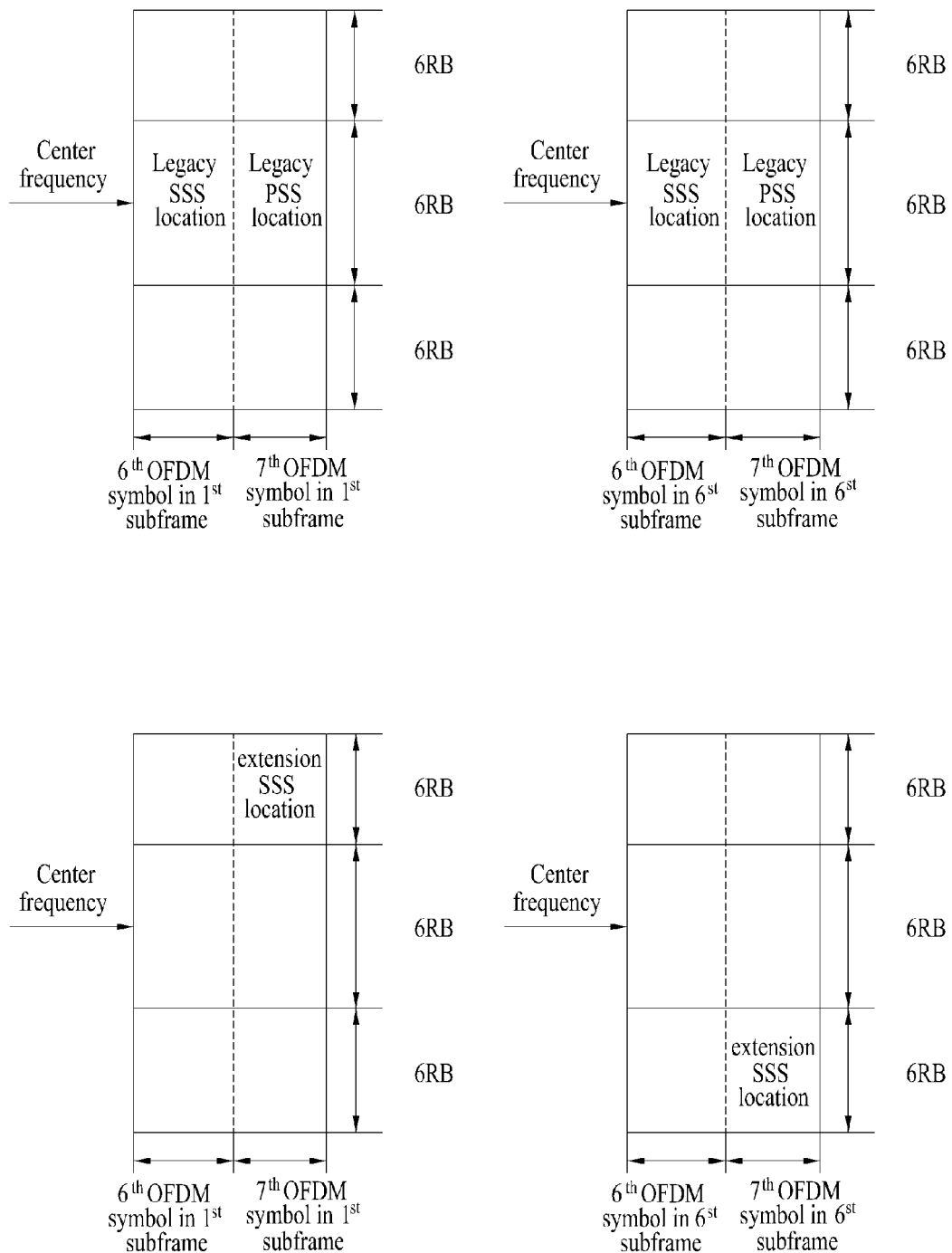

Referring to FIG. 11, for PSS/SSS transmitted on an extension carrier, frequency hopping may apply between a first half radio frame and a second half radio from of a radio frame. In this case, the frequency hopping may include x RB with reference to a frequency region having legacy PSS/SSS transmitted therein, where x may include an arbitrary integer. In particular, the x may be defined in advance (e.g., the x may be determined variably depending on a whole bandwidth of an extension carrier) or a specific frequency region may be indicated through upper layer signaling. For instance, the frequency hopping can be performed by 6 RBs, as shown in FIG. 11, with reference to the frequency region in which the legacy PSS/SSS is transmitted. Alternatively, PSS/SSS transmitted on an extension carrier may have a root sequence for generating the PSS/SSS, which is different from a root sequence of a legacy LTE/LTE-A system. In particular, root sequence indexes of PSS in a legacy LTE/LTE-A system include 25, 29 and 34, PSS transmitted on an extension carrier can use a root sequence different from that of the PSS in the legacy LTE/LTE-A system.

As mentioned in the forgoing description, a user equipment can acquire 10 ms synchronization through PSS and/or SSS transmitted on an extension carrier, which may not be sufficient for the user equipment to acquire a detailed synchronization. Hence, the user equipment can further use a $2^{nd}$ signal carried on REs of a prescribed patter in acquiring synchronization for an extension carrier. In this case, the $2^{nd}$ signal may include a reference signal, and more particularly, CRS and/or CSI-RS. Yet, in order for user equipments using an extension carrier to acquire synchronization through the extension carrier only, the CRS or the CSI-RS can be transmitted on specific time/frequency resources as shown in FIGS. 12 to 16.

Figure 12:
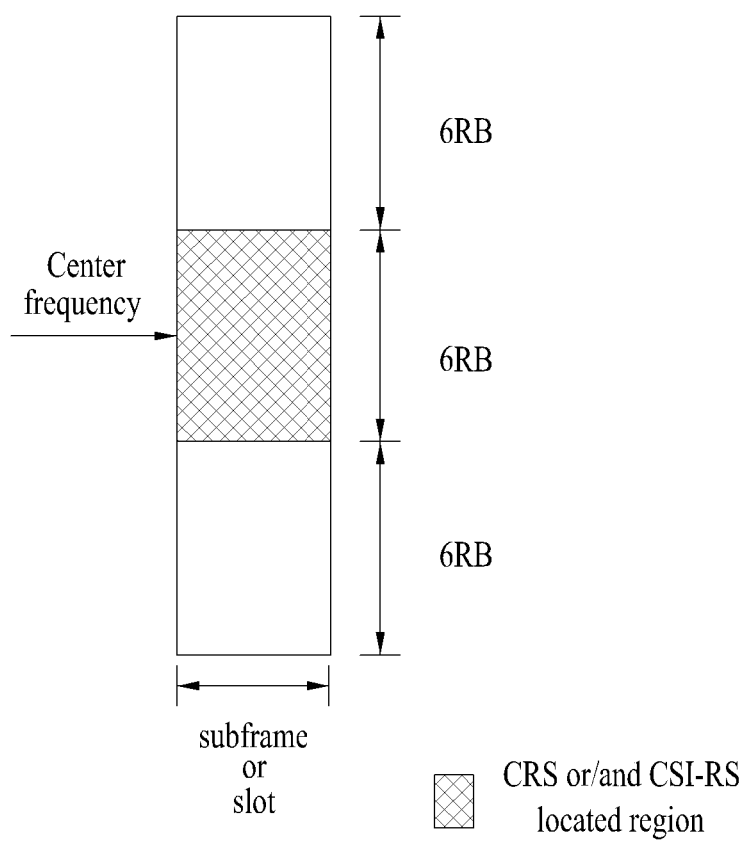

FIG. 12 is a diagram of a region in which a $2^{nd}$ signal is transmitted on a frequency resource according to one embodiment of the present invention. Referring to FIG. 12, CRS or CSI-RS can be transmitted through 6 RBs in the middle of a whole bandwidth of an extension carrier. In this case, the 6 RBs may be variable determined depending on the whole bandwidth of the extension carrier. For instance, if the whole bandwidth of the extension carrier is 10 MHs, 6 RBs can be set to be used. For another instance, if the whole bandwidth of the extension carrier is 20 MHs, 12 RBs twice more than the former RBs can be set to be used. Although FIG. 12 shows that 6 RBs are used centering the middle of the whole bandwidth, it is able to use y RB centering on x RB with reference to a center frequency like the former case of the aforementioned PSS/SSS (where, y is an arbitrary integer). Yet, the embodiment of the present invention does not exclude a case that a $2^{nd}$ signal is transmitted using all of the whole bandwidth of the extension carrier.

Figure 13:
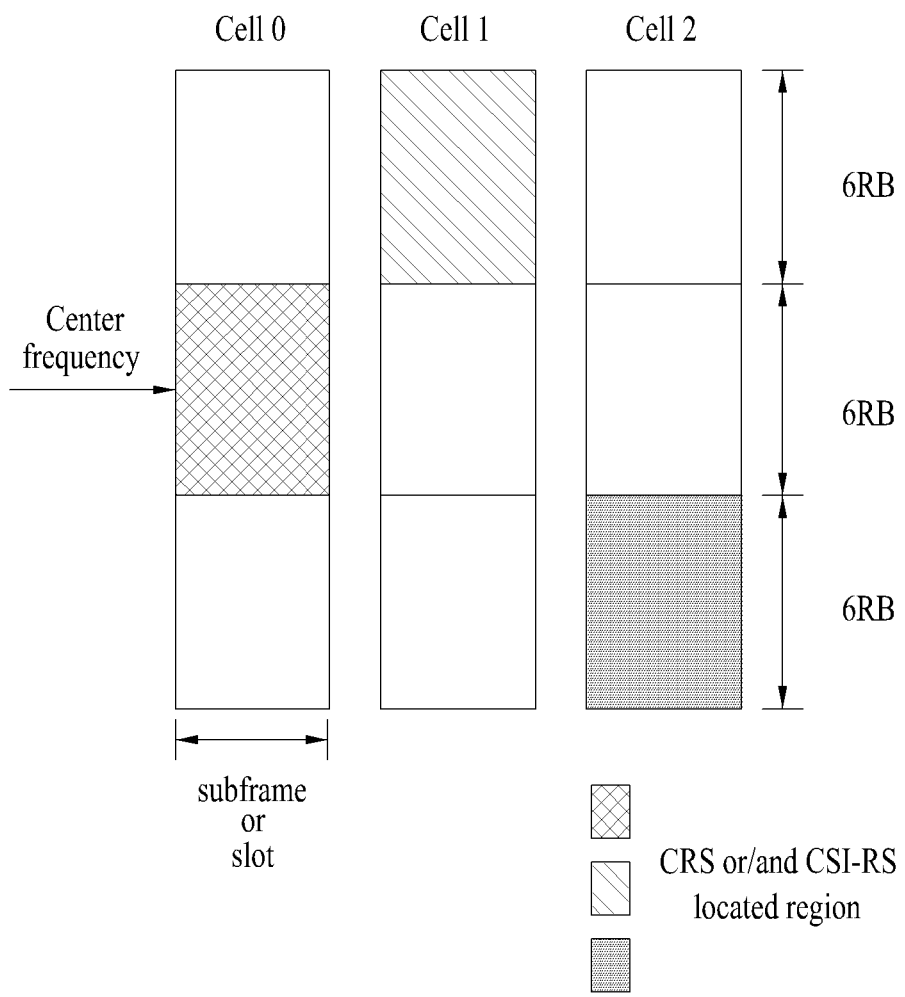

When a $2^{nd}$ signal is transmitted on n RBs (where n is an integer and may be 6 like FIG. 12), FIG. 13 shows that inter-cell interference is mitigated by differentiating a corresponding location in accordance with a cell identifier. In particular, for instance, if CRS or CSI-RS is transmitted on n contiguous RBs, a whole band can be divided into n groups. And, a prescribed one of the n groups can be designated in accordance with a cell identifier. And, in this case, locations of the n RBs can be determined by Formula 6.

$$n(N_{ID}^{cell} \bmod \lfloor N_{DL}^{RB}/n \rfloor)+i, i=0,\ldots,n \qquad \text{[Formula 6]}$$

In Formula 6, $N_{ID}^{cell}$ means the cell identifier and $N_{DL}^{RB}$ means the number of resource blocks on the whole frequency band.

According to the above-described settings, even if a subframe for transmitting a $2^{nd}$ signal and a pattern of the $2^{nd}$ signal are the same of a neighbor cell, it is able to mitigate interference caused by $2^{nd}$ signals of neighbor cells.

Figure 14:
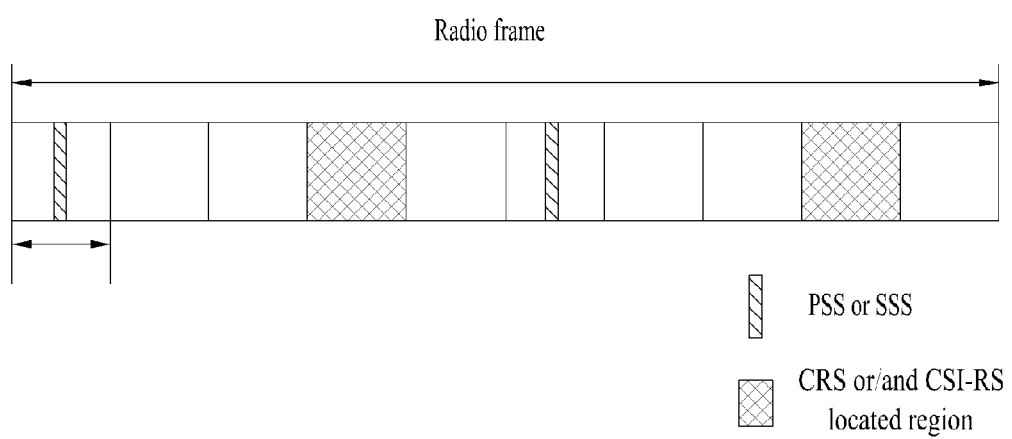

FIG. 14 is a diagram of a region in which a $2^{nd}$ signal is transmitted on a time resource according to one embodiment of the present invention. And, FIG. 14 shows that one of a $1^{st}$ signal, PSS and SSS is transmitted in a $1^{st}$ subframe and a $6^{th}$ subframe. In this case, a $2^{nd}$ signal, CRS and/or CSI-RS can be transmitted in a specific subframe except the subframe having the 1t signal transmitted therein. For instance, referring to FIG. 14, the $2^{nd}$ signal can be transmitted through a $4^{th}$ subframe and a $9^{th}$ subframe. In this case, a location of the subframe having the $2^{nd}$ signal transmitted therein may be determined as different from the location shown in FIG. 14 and the $1^{st}$ signal may be transmitted in the same manner shown in FIG. 10 (b). Moreover, the $2^{nd}$ signal may be transmitted not through the whole subframe determined for transmission but by slot unit. Unlike the description with reference to FIG. 14, the $2^{nd}$ signal may be transmitted in all subframes except the subframe having the $1^{st}$ signal transmitted therein, which is not preferable in aspect of overhead.

FIG. 15 shows that a $2^{nd}$ signal transmitted subframe varies depending on a cell identifier. Referring to FIG. 15, it can be observed that a $2^{nd}$ signal is transmitted in $4^{th}$ and $9^{th}$ subframes of Cell 0, in $3^{rd}$ and $8^{th}$ subframes of Cell 1, or in $5^{th}$ and $10^{th}$ subframes of Cell 2. Thus, by determining a subframe in which a $2^{nd}$ signal is transmitted in accordance with a cell identifier, it is able to reduce interference that may be caused in case of using the same pattern of the $2^{nd}$ signal between neighbor cells.

Although specific resources having $2^{nd}$ signals transmitted thereon are described in aspects of frequency and time resources with reference to FIGS. 12 to 15, it may be able to transmit a $2^{nd}$ signal using a specific resource in case of combining two kinds of resources. For instance, a $2^{nd}$ signal can be transmitted through 6 RBs in the middle of a whole bandwidth in $4^{th}$ and $9^{th}$ subframes. Besides, it is apparent to those skilled in the art, to which the present invention pertains, that a $2^{nd}$ signal can be transmitted through a specific resource combined in the aforementioned examples.

In case of configuring the aforementioned $2^{nd}$ signal transmitted resource with 6 RBs, it can be transmitted in a distributed manner. In particular, the corresponding transmission can be performed in a manner of distributing the resource across a whole frequency bandwidth. For instance, referring to FIG. 16 (a), 6 RBs can be transmitted in a manner of being distributed. In particular, FIG. 16 (a) shows that 6 RBs are transmitted in a manner of being located to be allocated by hopping 1 RB centering on a center frequency. In this case, an interval of RB can be set variously as 2 RBs, 3 RBs and the like in a manner different from that shown in the drawing. Moreover, the RB interval can be determined in consideration of a whole bandwidth of an extension carrier. For instance, if a whole bandwidth amounts to 100 RBs, a $2^{nd}$ signal transmitted RB can appear by 16-RB interval. For another instance, if a whole bandwidth amounts to 50 RBs, a $2^{nd}$ signal transmitted RB can appear by 8-RB interval.

Figure 16:
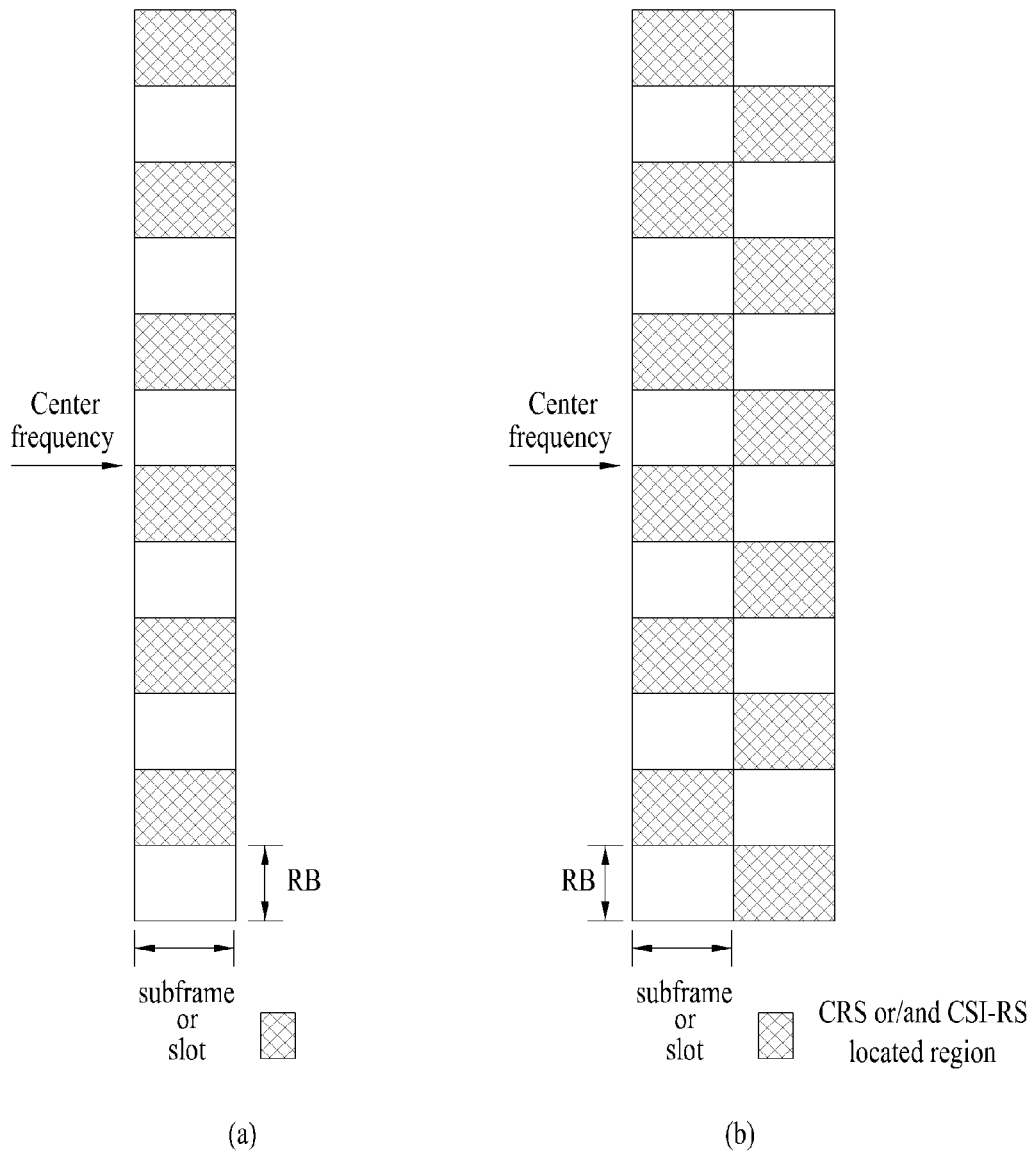

In case that a $2^{nd}$ signal transmitted RB is transmitted in the distributed manner shown in FIG. 16 (a), referring to FIG. 16 (b), it is able to apply frequency hopping in accordance of a subframe. In particular, if a $2^{nd}$ signal is transmitted in all subframes or specific subframe/slot on a full band or a specific frequency band, if the distributed transmission shown in FIG. 16 (a) is determined in a prescribed subframe/slot, it may be able to apply 1-RB frequency hopping to a next subframe/slot for transmitting a $2^{nd}$ signal. For clarity, 2 subframes/slots are contiguously shown in FIG. 16 (b). In this case, as mentioned in the foregoing description with reference to FIG. 14, the 2 subframes/slots may mean the $4^{th}$ subframe/slot and the $9^{th}$ subframe/slot, respectively. Although the frequency hopping is shown as 1 RB for example, it can be set variously as n RBs (where, n is an integer) in consideration of a whole bandwidth of an extension carrier. Information on frequency hopping may be configured through upper layer signaling or can be indicated by a cell (e.g., PCell), which notifies resource use of an extension carrier and system information, using a DCI format.

Information on the $2^{nd}$ signal transmitted specific resource can be configured through upper layer signaling or can be delivered by a cell (e.g., PCell), which notifies resource use of an extension carrier and system information, through a DCI format. In this case, the delivery through the DCI format can be transmitted through CSS or USS of PDCCH/ePDCCH of a cell (e.g., PCell) that schedules an extension carrier. In case of the transmission through the CSS, since the information can be notified using a single DCI format for user equipments that use extension carrier, it may be more efficient than the case of notifying the information using the USS for each user equipment. In case of the transmission through the CSS, it is necessary to consider not increasing the number of blind decodings performed by the user equipment.

Meanwhile, the above description is made on the assumption that a $2^{nd}$ signal transmitted specific resource is determined statically. On the other hand, the specific resource is dynamically determined and the determined specific resource can be notified to a user equipment. In particular, a base station obtains information on a specific resource used by neighbor cells for a transmission of a $2^{nd}$ signal and is then able to determine the specific resource for the $2^{nd}$ signal in a manner of avoiding interferences with the neighbor cells. And, the information on the dynamically determined specific resource can be delivered through upper layer signaling or DCI. In case of using the DCI, the corresponding information can be delivered through CSS or USS of PDCCH/ePDCCH of a cell (e.g., PCell) that schedules an extension carrier. If the information on the dynamically determined specific resource is delivered through the DCI, it is able to use a bitmap equal to the total number of RBs configuring a system bandwidth. In particular, it is able to use a method of setting a bit corresponding to a $2^{nd}$ signal transmitted RB to 1 in a bitmap corresponding to the total RB number of the system bandwidth. Alternatively, it may be able to use RIV value defined in the legacy LTE/LTE-A system. This is described in detail as follows. First of all, a $2^{nd}$ signal transmitted RB can be indicated through RVI value calculated by Formula 7.

$$RIV = N_{RB}^{DL}(L_{CRBs}-1)+RB_{start} \qquad \text{[Formula 7]}$$

In Formula 7, $N_{RB}^{DL}$ means the number of RBs in a whole bandwidth of an extension carrier, $L_{CRBs}=6$ means the number of contiguous RBs, and $RB_{start}$ means a start location of RB that carries a $2^{nd}$ signal. Looking into the application example of Formula 5, if a $2^{nd}$ signal is transmitted on 6 contiguous RBs ($L_{CRBs}=6$). $N_{RB}^{DL}$ is set to 100, and the 6 RBs start with $10^{th}$ RB ($RB_{start}=9$), RIV value becomes 509 by Formula 5. This RIV value can be transmitted to a user equipment by being represented as bits.

Alternatively, a whole band can be grouped into the number of RBs for carrying a $2^{nd}$ signal. In doing so, it is able to transmit information on the $2^{nd}$ signal transmitted region to a user equipment in a manner of representing the $2^{nd}$ signal transmitted group using the above-mentioned method, i.e., the bitmap or the RIV method.

As mentioned in the above description, a user equipment can acquire synchronization for an extension carrier using a $1^{st}$ signal and a $2^{nd}$ signal. In doing so, the $1^{st}$ signal is not transmitted but the $2^{nd}$ signal is transmitted only. This may correspond to a case that it is enough to acquire synchronization using the $2^{nd}$ signal only since the $2^{nd}$ signal is transmitted at a frequency by the aforementioned method or a frequency higher than that of the aforementioned method. Moreover, the $2^{nd}$ signal may be usable for a user equipment to measure a channel of an extension carrier as well as to acquire synchronization.

Meanwhile, in case that the aforementioned extension carrier is used for an uplink, its usage can be determined as follows.

i) Presence or Non-Presence of PUCCH Transmission

In a legacy LTE/LTE-A system, PUCCH transmission is possible in PCell only. Uplink and downlink in a legacy system have SIB2 (system information block 2) linkage. When cross carrier scheduling is not applied, if PDCCH indicates a UL grant, a user equipment assigns PUSCH to an uplink having the SIB linkage to the corresponding downlink. If an extension carrier does not have SIB2, it cannot be defined as PCell or SCell. Yet, if a part for a linkage of DL/UL is modified in the definition of cell later, an extension carrier can be defined as PCell or SCell. Since a UL extension carrier cannot be configured as PCell, PUCCH may not be transmitted on the UL extension carrier. Yet, if a plurality of cell groups are configured and a cell capable of transmitting PUCCH is configured for each of the cell groups, PUCCH transmission on the UL extension carrier may be necessary. Yet, since an extension carrier may be used to exclude such a high-power transmitted or interference-sensitive channel as PUCCH and the like, it may be necessary to prohibit the transmission of the PUCCH. In this case, a base station can set the PUCCH transmission to be performed in another cell except the UL extension carrier within the cell group.

For instance, a user equipment may not transmit PUCCH on an extension carrier in accordance with RRC configuration of preset agreement. If a user equipment is set to transmit PUCCH and PUSCH non-simultaneously or simultaneously, the user equipment transmits control channels in PCell in a manner that the control channels are multiplexed with data of the PUSCH and is also able to transmit the PUSCH using an extension carrier.

Yet, in a cell group used environment, PUCCH transmission on a UL extension carrier can be set possible. In this case, the cell group may include one of a combination of cells belonging to the same frequency band, a combination of cells using the same TDD configuration, a combination of cells having the same UL transmission timing, a combination of cells having a preset timing advance difference in-between, and the like. When the cell group is used, if the PUCCH transmission on an extension carrier is always prohibited, restrictions are put on the cell group configuration and the cell setup of a base station. Hence, in order to guarantee the maximum self-regulation in the cell group configuration and cell setup of the base station, the transmission of the PUCCH can be configured in a manner of being allowed limitedly only for a case of a UL extension carrier belonging to the cell group in which PCell is not included. For instance, if a UL extension carrier is defined as PCell (virtual) (or the UL extension carrier operates in a manner similar to that of PCell) in a single cell group, PUCCH can be transmitted on an extension carrier. For another instance, if a UL extension carrier is defined as SCell (or the UL extension carrier operates in a manner similar to that of SCell) in a single cell group, PUCCH is not transmitted but PUCCH for ACK/NACK or CSI can be transmitted through PCell (virtual) defined in the cell group.

ii) Presence or Non-Presence of DMRS Transmission

DMRS for PUCCH demodulation can configure a UL extension carrier if PUCCH is transmitted on an extension carrier.

iii) Presence or Non-Presence of SRS Transmission

In case that an extension carrier is used in TDD mode, information of measuring a channel of DL using CSI-RS of DL by channel reciprocity of DL/UL can be used for UL. In particular, if a moving speed of a user equipment is low, since a channel state does not change rapidly, an actual UL channel can be measured more accurately in measuring a UL channel using the measurement of the DL channel. Hence, in this case, SRS may not be transmitted on a UL extension carrier. In doing so, since a last OFDM symbol used in case of transmitting SRS can be used as PUSCH, it is able to further enhance spectral efficiency.

iv) Presence or Non-Presence of RACH (Random Access Channel) Transmission

If a UL extension carrier uses a band adjacent to a carrier in LTE/LTE-A system, a corresponding UL timing may be used as a timing of the UL extension carrier. Hence, in this case, it is able to define that RACH is not transmitted on the UL extension carrier.

Yet, the UL extension carrier can have a UL timing different from that of PCell. Alternatively, a cell group having the UL extension carrier belong thereto may have a UL timing different from that of a PCell belonging cell group. Hence, in this case, RACH may be allowed to be transmitted on the UL extension carrier. In doing so, whether to transmit RACH on the UL extension carrier can be set cell-specifically or UE-specifically using RRC or MAC or defined in advance.

v) UL/DL Configuration in TDD

LTE-A Release 10 is designed on the assumption that the same UL-DL configuration is used between neighbor base stations. The reason for this is that a DL signal of a specific base station and a UL signal transmitted to a neighbor base station by a specific user equipment may collide with each other if different UL-DL configurations are used by neighbor base stations. Yet, the use of the same DL-UL configuration between the neighbor base stations ruins flexibility of resource managements of a base station. In particular, if different UL-DL configurations can be used among a plurality of base stations with reference to a traffic size and the like, resource managements can be performed further flexibly and actively. For instance, while base stations use the same UL-DL configuration all, if UL resources required for user equipments in a specific base station increase more, the corresponding base station changes the UL-DL configuration into UL-DL configuration having more UL subframes and is then able to perform a communication service with more UL resources. For another instance, while base stations use the same UL-DL configuration all, if the number of user equipments requiring communication within a specific base station decreases in a time slot having very small call traffics like daybreak time, the corresponding base station changes the UL-DL configuration into a UL-DL configuration having less UL subframes to decrease unnecessary DL transmissions, thereby reducing power consumption of the base station. The above-described substance can be exactly applied to a case of using the same UL-DL configuration between cells in CA environment. Particularly, different UL transmission timings are necessary between cells in an inter-band CA environment. Hence, a user equipment may be able to use a plurality of RF (radio frequency) ends in order to perform a communication in the inter-band CA environment. Thus, a configuration of UL-DL configuration different for each RF end may be possible without inter-cell interference. Due to the above-mentioned reasons, different UL-DL configurations between base stations or/and cells (or, CCs, bands, etc.) in CA are allowable.

Moreover, in case of the inter-band CA, propagation/path delays, fading channels and propagation/path losses may differ due to different inter-band frequency properties. Therefore, a user equipment may need different inter-band transmitting and receiving timing settings and different inter-band transmission power settings. In particular, if cells differ from each other in UL transmitting timing of a user equipment, transmission timing of ACK/NACK or the like may be restricted by the timing difference.

Figure 17:
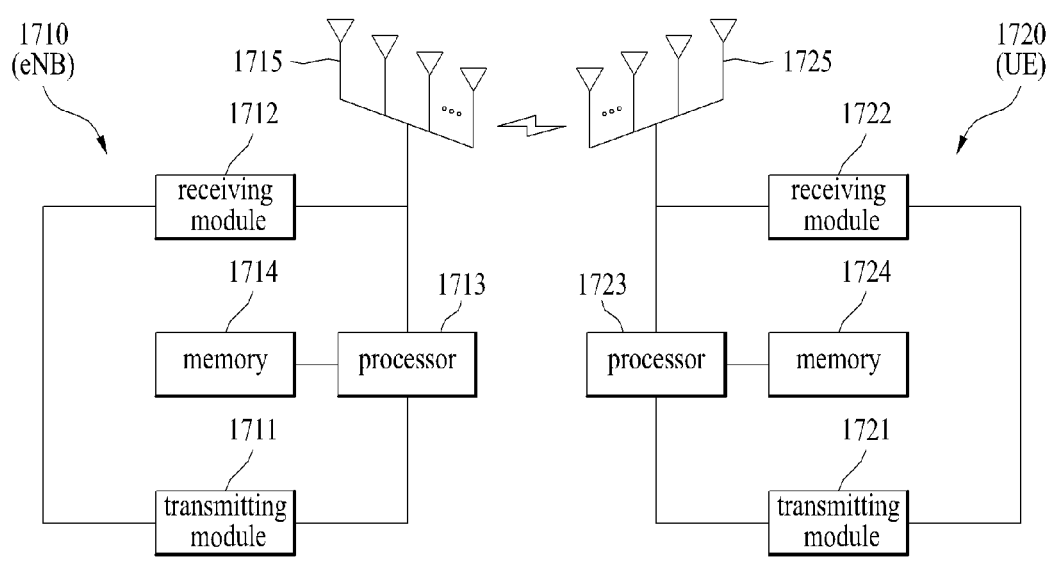
FIG. 17 is a diagram for configurations of a base station device and a user equipment device according to one preferred embodiment of the present invention.

FIG. 17 is a diagram for configurations of a base station device and a user equipment device according to the present invention.

Referring to FIG. 17, a base station device 1710 according to the present invention may include a receiving module 1711, a transmitting module 1712, a processor 1713, a memory 1714 and a plurality of antennas 1715. A plurality of the antennas 1715 may mean a base station device supportive of MIMO transmission and reception. The receiving module 1711 can receive various signals, data and information in uplink from a user equipment. The transmitting module 1712 can transmit various signals, data and information in downlink to the user equipment. And, the processor 1713 can control overall operations of the base station device 1710.

The processor 1713 of the base station device 1710 according to one embodiment of the present invention can perform the methods mentioned in the foregoing description.

The processor 1713 of the base station device 1710 performs functions of operating and processing information received by the base station device 1710, information to be transmitted by the base station device 1710 and the like. The memory 1714 can store the operated and processed information and the like for a prescribed period and can be substituted with such a component as a buffer (not shown in the drawing) and the like.

Referring to FIG. 17, a user equipment device 1720 according to the present invention may include a receiving module 1721, a transmitting module 1722, a processor 1723, a memory 1724 and a plurality of antennas 1725. A plurality of the antennas 1725 may mean a user equipment device supportive of MIMO transmission and reception. The receiving module 1721 can receive various signals, data and information in downlink from a base station. The transmitting module 1722 can transmit various signals, data and information in uplink to the base station. And, the processor 1723 can control overall operations of the user equipment device 1720.

The processor 1723 of the user equipment device 1720 according to one embodiment of the present invention can perform the methods mentioned in the foregoing description.

The processor 1723 of the user equipment device 1720 performs functions of operating and processing information received by the user equipment device 1720, information to be transmitted by the user equipment device 1720 and the like. The memory 1724 can store the operated and processed information and the like for a prescribed period and can be substituted with such a component as a buffer (not shown in the drawing) and the like.

In the above-mentioned detailed configurations of the base station device 1710 and the user equipment device 1720, the contents or items explained in the descriptions of the various embodiments of the present invention may be independently applicable or at least two embodiments of the present invention may be simultaneously applicable. And, redundant descriptions shall be omitted from the following description for clarity.

The description of the base station device 1710 with reference to FIG. 17 may be identically applicable to a relay node device as a DL transmitting entity or a UL receiving entity. And, the description of the user equipment device 1720 with reference to FIG. 17 may be identically applicable to a relay node device as a UL transmitting entity or a DL receiving entity.

Embodiments of the present invention can be implemented using various means. For instance, embodiments of the present invention can be implemented using hardware, firmware, software and/or any combinations thereof.

In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

While the present invention has been described centering on an example applied to a 3GPP LTE mobile communication system, the present invention is applicable to a variety of mobile communication systems by the same or equivalent principles.

The invention claimed is:

1. A method for acquiring synchronization, at a user equipment in a wireless communication system, the method comprising:
receiving a primary synchronization signal (PSS) without a secondary synchronization signal (SSS) in a first subframe via an extension carrier, the PSS being different from a common reference signal (CRS) and a dedicated reference signal (DRS);
receiving a channel state information-reference signal (CSI-RS) on resource blocks (RBs) in one or more second subframes other than the first subframe; and
acquiring the synchronization for the extension carrier using the PSS and the CSI-RS instead of using the SSS,
wherein when the CSI-RS is used for the synchronization with the extension carrier, the resource blocks (RBs) for the CSI-RS are determined by the following formula:

$$n(N_{ID}^{cell} \mod \lfloor N_{DL}^{RB}/n \rfloor) + i, \ i=0,\ldots,n,$$

where 'n' denotes a total number of the RBs carrying the CSI-RS, $N_{ID}^{cell}$ denotes a cell identifier of a base station, and $N_{DL}^{RB}$ denotes a number of resource blocks included in the entire frequency band of the extension carrier.

2. The method according to claim 1, wherein accessibility of the extension carrier depends on user equipment capability.

3. The method according to claim 1, wherein the extension carrier is indicated by the physical downlink control channel of a non-extension carrier.

4. The method according to claim 1, wherein the RBs carrying the CSI-RS are discontinuously distributed over an entire frequency band of the extension carrier, and wherein the total number of the discontinuously distributed RBs carrying the CSI-RS depends on a size of the entire frequency band of the extension carrier.

5. The method according to claim 1, wherein frequency hopping is applied to the locations of the RBs in accordance with a corresponding subframe of the one or more second subframes.

6. The method according to claim 1, wherein the one or more second subframes are determined in accordance with the cell identifier of a base station.

7. The method according to claim 1, wherein an index of the first subframe within a frame is '0' or '5'.

8. The method according to claim 1, wherein the primary synchronization signal has a predetermined root index excluding '25', '29' and '34'.

9. A method of transmitting a signal for synchronization acquisition, which is transmitted by a base station in a wireless communication system, comprising:
transmitting a primary synchronization signal (PSS) without a secondary synchronization signal (SSS) in a first subframe via an extension carrier, the PSS being different from a common reference signal (CRS) and a dedicated reference signal (DRS); and
transmitting a channel state information-reference signal (CSI-RS) on resource blocks (RBs) in or more second subframes other than the first subframe,
wherein the CSI-RS is provided for a user equipment to acquire synchronization for the extension carrier instead of the SSS, and
wherein when the CSI-RS is used for the synchronization with the extension carrier, the resource blocks (RBs) for the CSI-RS are determined by the following formula:

$$n(N_{ID}^{cell} \mod \lfloor N_{DL}^{RB}/n \rfloor) + i, \ i=0,\ldots,n,$$

where 'n' denotes a total number of the RBs carrying the CSI-RS, $N_{ID}^{cell}$ denotes a cell identifier of a base station, $N_{DL}^{RB}$ denotes a number of resource blocks included in the entire frequency band of the extension carrier.

10. A user equipment comprising:
a receiver that receives a primary synchronization signal (PSS) without a secondary synchronization signal (SSS) in a first subframe via an extension carrier, the PSS being different from a common reference signal (CRS) and a dedicated reference signal (DRS), and to receive a channel state information-reference signal (CSI-RS) on resource blocks (RBs) in one or more second subframes other than the first subframe; and
a processor that acquires the synchronization for the extension carrier using the PSS and the CSI-RS instead of using the SSS,
wherein when the CSI-RS is used for the synchronization with the extension carrier, the resource blocks (RBs) for the CSI-RS are determined by the following formula:

$$n(N_{ID}^{cell} \mod \lfloor N_{DL}^{RB}/n \rfloor) + i, \ i=0,\ldots,n,$$

where 'n' denotes a total number of the RBs carrying the CSI-RS, $N_{ID}^{cell}$ denotes a cell identifier of a base station, and $N_{DL}^{RB}$ denotes a number of resource blocks included in the entire frequency band of the extension carrier.

11. A base station comprising:
a transmitter that transmits a primary synchronization signal (PSS) without a secondary synchronization signal (SSS) in a first subframe via an extension carrier, the PSS being different from a common reference signal (CRS) and a dedicated reference signal (DRS), and transmits a channel state information-reference signal (CSI-RS) on resource blocks (RBs) in one or more second subframes other than the first subframe; and
a processor that controls the transmitter,
wherein the CSI-RS is provided for a user equipment to acquire synchronization for the extension carrier instead of the SSS, and
wherein when the CSI-RS is used for the synchronization with the extension carrier, the resource blocks (RBs) for the CSI-RS are determined by the following formula:

$$n(N_{ID}^{cell} \mod \lfloor N_{DL}^{RB}/n \rfloor) + i, \ i=0,\ldots,n,$$

where 'n' denotes a total number of the RBs carrying the CSI-RS, $N_{ID}^{cell}$ denotes a cell identifier of a base station, and $N_{DL}^{RB}$ denotes a number of resource blocks included in the entire frequency band of the extension carrier.

* * * * *